United States Patent
Yamakoshi et al.

(10) Patent No.: US 8,553,140 B2
(45) Date of Patent: Oct. 8, 2013

(54) IMAGE ACQUISITION APPARATUS AND IMAGE ACQUISITION METHOD

(75) Inventors: Takamichi Yamakoshi, Tokyo (JP); Koichiro Kishima, Kanagawa (JP)

(73) Assignee: Sony Corporation, Tokyo (JP)

( * ) Notice: Subject to any disclaimer, the term of this patent is extended or adjusted under 35 U.S.C. 154(b) by 126 days.

(21) Appl. No.: 12/850,251

(22) Filed: Aug. 4, 2010

(65) Prior Publication Data

US 2011/0037875 A1    Feb. 17, 2011

(30) Foreign Application Priority Data

Aug. 17, 2009   (JP) ................. P2009-188776

(51) Int. Cl.
 *H04N 5/222*    (2006.01)

(52) U.S. Cl.
 USPC ............ 348/370; 348/79; 348/80; 348/362; 348/364; 348/371

(58) Field of Classification Search
 USPC ................ 348/79, 80, 362, 364, 370, 371, 348/207.99–376
 See application file for complete search history.

(56) References Cited

U.S. PATENT DOCUMENTS

| | | | |
|---|---|---|---|
| 5,115,169 A | 5/1992 | Aoki | |
| 5,491,533 A | 2/1996 | Sakamoto | |
| 6,803,947 B1 * | 10/2004 | Tomioka | 348/220.1 |
| 2005/0259177 A1 * | 11/2005 | Senoo | 348/362 |
| 2007/0121199 A1 | 5/2007 | Suzuki et al. | |
| 2008/0002166 A1 * | 1/2008 | Ebihara | 355/40 |

FOREIGN PATENT DOCUMENTS

| | | |
|---|---|---|
| JP | 04-186235 | 7/1992 |
| JP | 09-322054 | 12/1997 |
| JP | 2000-098259 | 4/2000 |
| JP | 2001311988 | 11/2001 |
| JP | 2003-222801 | 8/2003 |
| JP | 2003-315682 | 11/2003 |
| JP | 2007-288731 | 11/2007 |
| JP | 2009-63656 | 3/2009 |
| JP | 2009-139479 | 6/2009 |

OTHER PUBLICATIONS

European Patent Office, Extended European Search Report, issued in connection with European Patent Application No. 10007256.0, mailed on Oct. 10, 2011. (7 pages).

Japanese Patent Office, Office Action issued in connection with Japanese Patent Application No. 2009-188776, dated Apr. 9, 2013. (3 pages).

* cited by examiner

*Primary Examiner* — Roberto Velez
*Assistant Examiner* — Yih-Sien Kao
(74) *Attorney, Agent, or Firm* — K&L Gates LLP

(57) ABSTRACT

An image acquisition apparatus includes: an imaging device on which an image of a small area allocated to an area to be imaged is formed; a detection section detecting intensity of light irradiated on the small area from a light source; an integration section integrating the intensity of light detected by the detection section; if an integration value of the intensity of light integrated by the integration section from a point in time when light is emitted from the light source is greater than a predetermined threshold value, a light-source control section terminates light emission; an exposure control section starting exposure of the imaging device before light is emitted from the light source and terminating exposure of the imaging device after emission of light from the light source is terminated; and an image acquisition section acquiring the image of the small area as a divided image from the imaging device.

10 Claims, 16 Drawing Sheets

IMAGE ACQUISITION APPARATUS AND IMAGE ACQUISITION METHOD

CROSS REFERENCES TO RELATED APPLICATIONS

The present application claims priority to Japanese Priority Patent Application JP 2009-188776 filed in the Japan Patent Office on Aug. 17, 2009, the entire content of which is hereby incorporated by reference.

BACKGROUND

The present application relates to an image acquisition apparatus and method for acquiring an image. The present application is preferably applied to a field of observation of a tissue section, for example.

To date, a biological sample, such as a tissue section, etc., used in a pathological field has been fixed on a microscope slide, and predetermined staining has been applied on the biological sample. In general, if a retention period of a biological sample becomes long, the biological sample itself deteriorates, and color fading, etc., occurs in the staining applied on the biological sample. Thereby, noticeability on the biological sample by a microscope deteriorates. Also, a biological sample is sometimes used for a diagnosis at a facility other than a facility such as a hospital, etc., where the biological sample is created. In that case, the biological sample is generally sent and received by mail, and thus it takes a certain time for the transfer.

Under these circumstances, a proposal has been made for an apparatus storing a biological sample as image data (for example, refer to Japanese Unexamined Patent Application Publication No. 2003-222801).

Also, in pathological diagnoses, high-precision biological sample images produced by enlarging biological samples at a predetermined magnification are used. Accordingly, the following proposal has been made of a microscope apparatus producing high-precision biological sample images (for example, refer to Japanese Unexamined Patent Application Publication No. 2009-63656). In the microscope apparatus, an area including a biological sample is divided into a plurality of small areas, the small areas are enlarged at a predetermined magnification, images of the small areas are captured, and a plurality of the divided small images are combined into a high-precision biological sample image.

SUMMARY

Incidentally, in the above-described microscope apparatuses, in general, exposure time periods when a plurality of the divided images are obtained, respectively, are kept at constant in order not to make large luminance differences.

However, even if a constant current is applied to a light source irradiating light on a biological sample, intensity of emitted light varies in accordance with a temperature of the light source itself. For example, as shown in FIG. 1, a halogen lamp used for a light source outputs a higher intensity immediately after starting light emission because of a low temperature of the halogen lamp itself, lowers the intensity with time as the temperature of the lamp increases, and goes into a thermal equilibrium state after passage of a predetermined time, outputting a constant intensity.

In such a case, in a microscope apparatus, intensity of light emitted from a light source varies with time, and thus even if an exposure time is kept constant, an exposure quantity on an imaging device changes for each divided image.

As a result, for example, as shown in FIG. 2, in a microscope apparatus, it is difficult to keep luminance values of divided images DP at constant. Thus, in a biological sample image SP produced by connecting divided images DP, joints of the divided images DP become conspicuous. In particular, a joint between an upper and a lower divided images DP becomes more conspicuous because the images are captured at greatly different time.

Thus, as shown in FIG. 3A, in general, in a microscope apparatus, exposure on an imaging device is started at time Ts when a light source has reaches a thermal equilibrium state after passage of a predetermined time from the light source starting light emission, and the exposure is terminated at time Te when a certain time has passed in order to capture divided images. Here, in FIG. 3A, a CCD (Charge Coupled Device) sensor is used as an imaging device. In a CCD sensor, it is possible to start and end exposure for all the pixels at the same time.

Accordingly, it is possible to reduce luminance differences among a plurality of divided images using this method. However, in this method, it takes time until the light source reaches a thermal equilibrium state, and thus the imaging time period becomes disadvantageously long.

Also, in the case of using a CMOS (Complementary Metal Oxide Semiconductor) image sensor as an imaging device, the CMOS image sensor starts and ends exposure in sequence for each line along an array of pixels, and thus, as shown in FIG. 3B, there has been a problem in that an imaging time period becomes further long. In this regard, in FIG. 3B, time Ts1 indicates exposure start time of a line on which exposure is started first, and time Ts2 indicates exposure start time of a line on which exposure is started last. Also, time Te1 indicates exposure end time of the line corresponding to time Ts1, and time Te2 indicates exposure end time of the line corresponding to time Ts2.

The present application has been made in consideration of the above-described points. It is desirable to propose an image acquisition apparatus and method for acquiring an image, which is capable of shortening an imaging time period, and reducing luminance differences among images of small areas allocated to an imaging object.

According to an embodiment, there is provided an image acquisition apparatus including: an imaging device on which an image of a small area allocated to an area to be imaged is formed; a detection section detecting intensity of light irradiated on the small area from a light source; an integration section integrating the intensity of light detected by the detection section; if an integration value of the intensity of light integrated by the integration section from a point in time when light is emitted from the light source is greater than a predetermined threshold value, a light-source control section terminates emission of light from the light source; an exposure control section starting exposure of the imaging device before light is emitted from the light source and terminating exposure of the imaging device after emission of light from the light source is terminated; and an image acquisition section acquiring the image of the small area as a divided image from the imaging device.

Also, according to another embodiment, there is provided a method of acquiring an image, the method including the steps of: detecting intensity of light irradiated from a light source on a small area allocated to an area to be imaged; integrating the intensity of light detected by the step of detecting; if an integration value of the intensity of light integrated by the step of integrating from a point in time when light is emitted from the light source is greater than a predetermined threshold value, controlling the light source so as to terminate emission of light from the light source; controlling exposure so as to start exposure of the imaging device on which an image of the small area is formed before light is emitted from the light source and to terminate exposure of the imaging device after emission of light from the light source is terminated; and acquiring the image of the small area as a divided image from the imaging device.

Thereby, a certain amount of light can be emitted from the light source while the imaging device is exposed so that it is possible to keep an exposure quantity of the imaging device constant when a plurality of divided images are obtained.

Also, according to another embodiment, there is provided an image acquisition apparatus including: an imaging device on which an image of a small area allocated to an area to be imaged is formed; a detection section detecting intensity of light irradiated on the small area from a light source; an integration section integrating the intensity of light detected by the detection section; a light-source control section emitting light from the light source such that a time interval between start and end of emission becomes constant; an exposure control section starting exposure of the imaging device before light is emitted from the light source by the light-source control section and terminating exposure of the imaging device after emission of light from the light source is terminated by the light-source control section; an image acquisition section acquiring the image of the small area as a divided image from the imaging device; a correction section correcting a luminance value of the divided image such that an integration value of intensity of light integrated by the integration section at the time when the divided image is captured becomes the same; and an image generation section generating one image by combining the divided images corrected by the correction section.

Also, according to another embodiment, there is provided a method of acquiring an image, the method including the steps of: detecting intensity of light irradiated from a light source on a small area allocated to an area to be imaged; integrating the intensity of light detected by the step of detecting; controlling the light source to emit light such that a time interval between start and end of emission becomes constant; controlling exposure so as to start exposure of the imaging device before light is emitted from the light source by the step of controlling the light source and terminating exposure of the imaging device after emission of light from the light source is terminated by the step of controlling the light source; acquiring the image of the small area as a divided image from the imaging device; correcting a luminance value of the divided image such that an integration value of intensity of light integrated by the step of integrating at the time when the divided image is captured becomes the same; and generating one image by combining the divided images corrected by the step of correcting.

Thereby, the luminance values of the divided images are corrected such that the integration values of intensities of light emitted from the light source while the imaging device is exposed become the same, and thus the luminance differences among divided images can be reduced.

As described above, by the present application, a certain amount of light can be emitted from the light source while the imaging device is exposed so that it is possible to keep exposure quantities of the imaging device at constant when a plurality of divided images are obtained. Thereby, it is possible to achieve an image acquisition apparatus and method for acquiring an image, which is capable of shortening an imaging time period, and reducing luminance differences among images of small areas allocated to an imaging object.

Also, by the present application, the luminance values of the divided images are corrected such that the integration values of intensities of light emitted from the light source while the imaging device is exposed become the same so that it is possible to keep exposure quantities of the imaging device at constant when a plurality of divided images are obtained. Thereby, it is possible to achieve an image acquisition apparatus and method for acquiring an image, which is capable of shortening an imaging time period, and reducing luminance differences among images of small areas allocated to an imaging object.

Additional features and advantages are described herein, and will be apparent from the following Detailed Description and the figures.

DETAILED DESCRIPTION

The present application is described below in detail with reference to the drawings according to an embodiment. The detailed description is provided as follows:

1. First embodiment
2. Second embodiment
3. Other embodiments

1. First Embodiment

1.1 Configuration of Biological-Sample-Image Acquisition Apparatus

Figure 1:
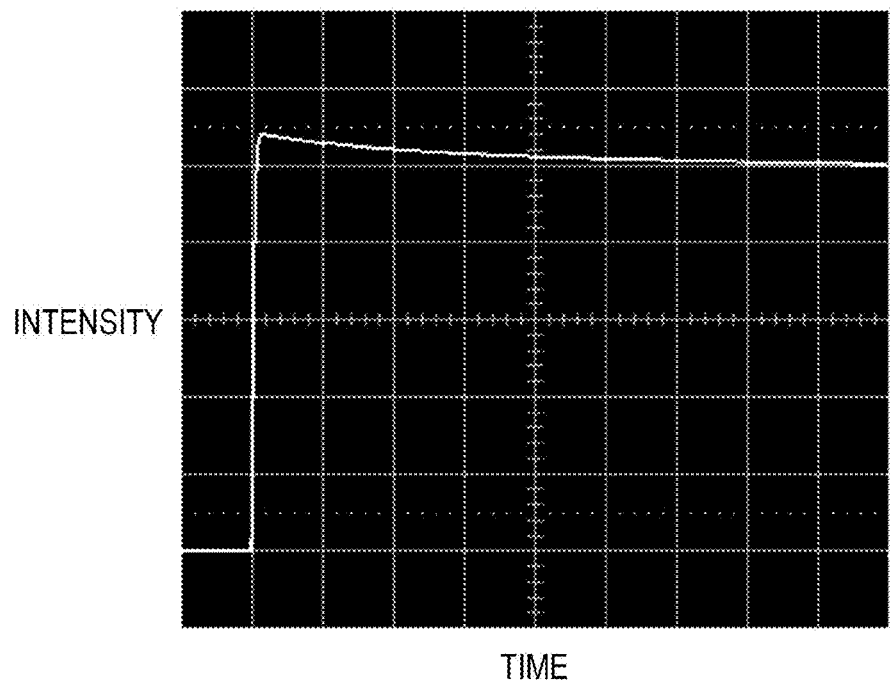
FIG. 1 is a graph illustrating a change in intensity of a halogen lamp.
Figure 2:
FIG. 2 is a schematic diagram illustrating a related-art biological sample image.
Figure 3A:
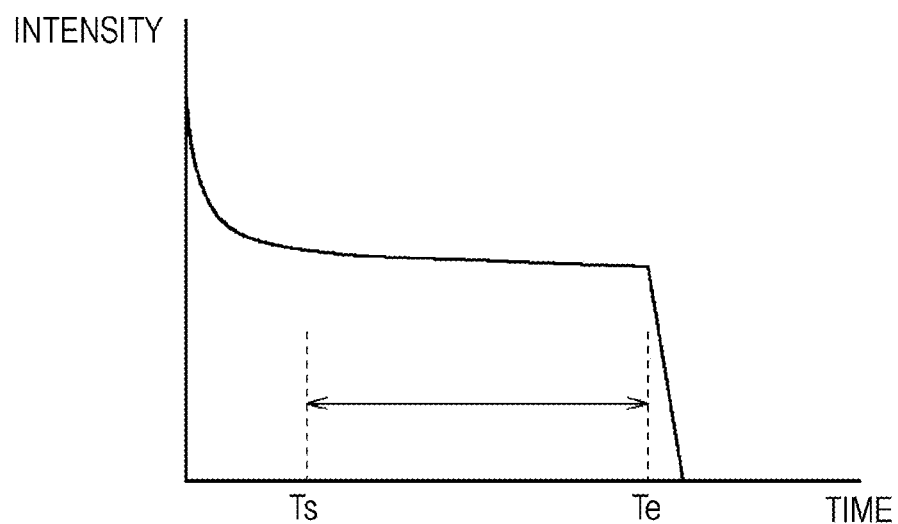
FIG. 3 is a graph illustrating a related-art relationship between light intensity and exposure time.
Figure 3B:
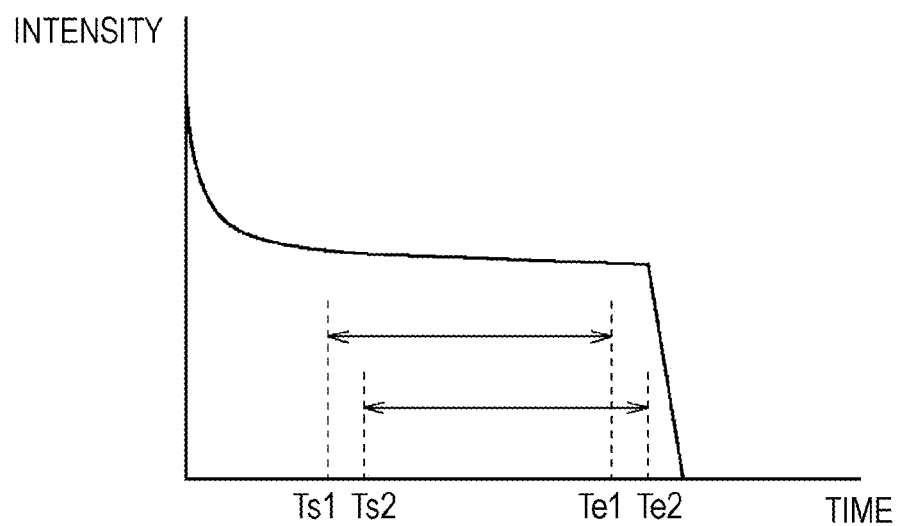
Figure 4:
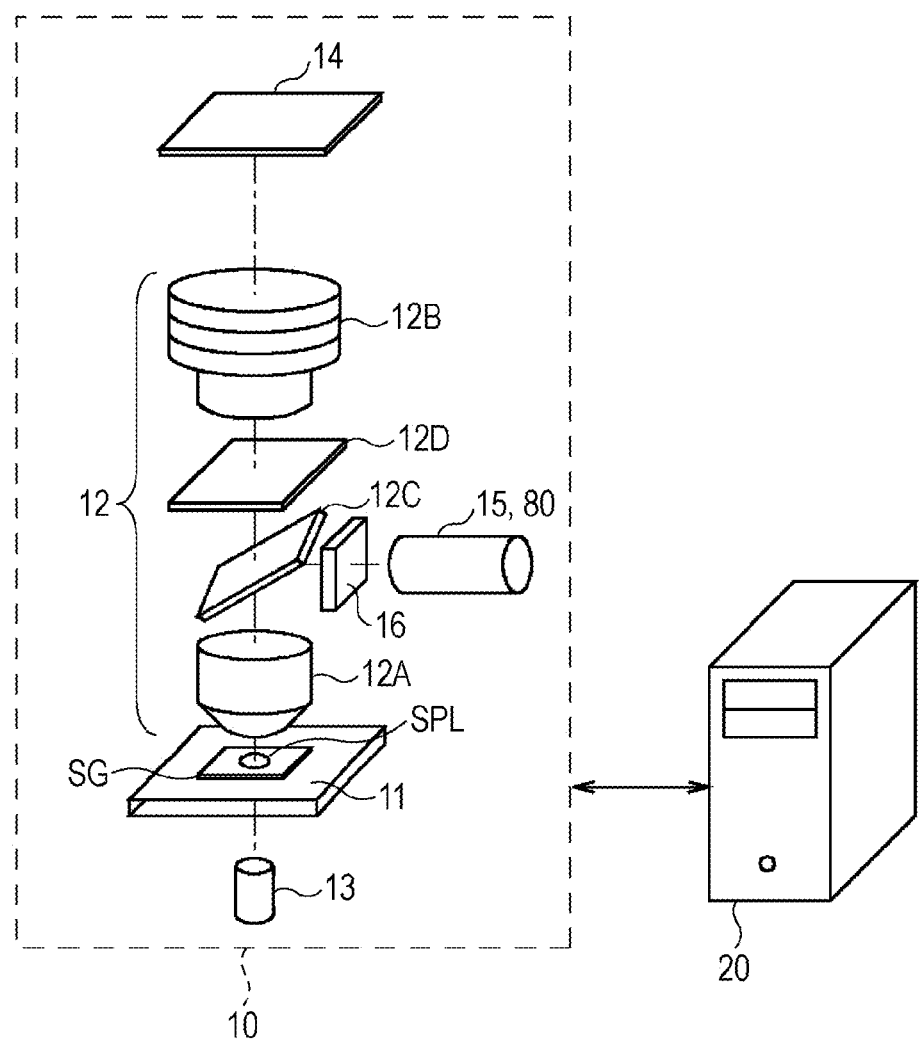
FIG. 4 is a schematic diagram illustrating a biological-sample-image acquisition apparatus.

FIG. 4 illustrates a biological-sample-image acquisition apparatus 1 according to an embodiment. The biological-sample-image acquisition apparatus 1 includes a microscope 10 and a data processing section 20.

The microscope 10 has a plane on which a biological sample SPL including a biomacromolecule, such as a tissue section, or a cell, or a chromosome, etc., can be placed, and has a stage (in the following, referred to as a movable stage) 11 movable in a parallel direction and in a perpendicular direction to that plane (in the x-, y-, and z-axis directions).

In this embodiment, the biological sample SPL is fixed on a microscope slide SG by a predetermined fixing method, and staining is applied to the biological sample SPL as necessary. The staining includes not only general staining as typified by HE (Hematoxylin-Eosin) staining, Giemsa stain or Papanicolaou stain, etc., but also fluorescence staining such as FISH (Fluorescence In-Situ Hybridization), an immunoenzymatic technique, etc.

An optical system 12 is disposed on one side of the plane of the movable stage 11 in the microscope 10, and a light-source unit 13 is disposed on the other side of the plane of the movable stage 11. The microscope 10 captures an image of a biological sample SPL either in a bright-field mode or a dark-field mode by changing the modes.

In the bright-field mode, the light-source unit 13 emits light under the control of the light-source control section 30 (FIG. 5), irradiates the light on the biological sample SPL disposed on one side of the plane of the movable stage 11 through an opening formed on the movable stage 11 as illumination light.

The microscope 10 enlarges a part of an image of the biological sample SPL obtained by the illumination light by an objective lens 12A and an imaging lens 12B of the optical system 12 at a predetermined magnification. And the microscope 10 forms an image enlarged by the objective lens 12A and the imaging lens 12B on an imaging surface of a CMOS image sensor 14.

In this regard, in the bright-field mode, in the microscope 10, a dichroic mirror 12C and an emission filter 12D can be removed from a light path between the objective lens 12A and the imaging lens 12B.

Incidentally, an excitation-light-source system 15 and an excitation filter 16 are disposed at a predetermined position of the microscope 10. In the dark-field mode, in the microscope 10, when an excitation-light-source system 15 emits light, excitation light, which is produced by transmitting only light having an excitation wavelength for fluorescence staining among the emitted light by the excitation filter 16 is reflected by a dichroic mirror 12C disposed between the objective lens 12A and the imaging lens 12B, and is led to the objective lens 12A. And, in the microscope 10, the excitation light is focussed by the objective lens 12A on the biological sample SPL disposed on the movable stage 11.

If fluorescence staining has been applied on the biological sample SPL fixed on the microscope slide SG, the fluorescent dye emit light by the excitation light. Light (in the following, also referred to as color development light) obtained by the emission is transmitted through the dichroic mirror 12C via the objective lens 12A. And the color development light reaches the imaging lens 12B through an emission filter 12D disposed between the dichroic mirror 12C and the imaging lens 12B.

The microscope 10 enlarges an image of the color development light by the objective lens 12A, and absorbs light other than the color development light (in the following, also referred to as the other light) by the emission filter 12D. And the microscope 10 enlarges an image of the color development light having lost the other light by the imaging lens 12B, and forms the image on the imaging surface of the CMOS image sensor 14.

On the other hand, the data processing section 20 generates the entire image of the biological sample SPL (in the following, also referred to as a biological sample image) using the CMOS image sensor 14, and stores the image as predetermined-format data (in the following, also referred to as sample data).

In this manner, the biological-sample-image acquisition apparatus 1 can store a biological sample SPL disposed on the microscope slide SG as an image in a microscopic state. Accordingly, it becomes possible for the biological-sample-image acquisition apparatus 1 to store the biological sample SPL over a long period of time without deteriorating states, such as fixing, staining, etc., compared with a case of storing the microscope slide SG itself.

1.2 Configurations of Light-Source Unit and Light-Source Control Section

Next, a description will be given of the light-source unit 13 and the light-source control section 30 controlling the light-source unit 13 using FIG. 5.

The light-source unit 13 has a configuration including a white LED (Light Emitting Diode) 13A outputting white light, a condenser 13B converting light emitted from the white LED 13A into substantially parallel light rays, and a photodetector 13C measuring intensity of light emitted from the white LED 13A.

Figure 6:
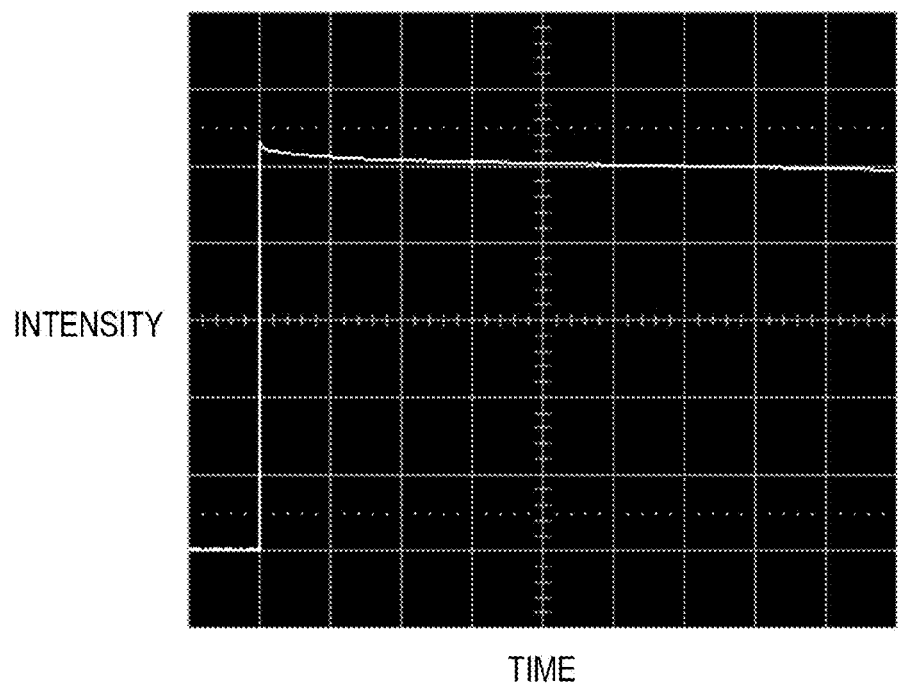
FIG. 6 is a graph illustrating a change in intensity of an LED.

As shown in FIG. 6, the white LED 13A has a characteristic in which if a constant current is applied, the LED outputs a higher intensity immediately after starting light emission because of a low temperature of the LED itself, lowers the intensity with time as the temperature of the LED increases, and goes into a thermal equilibrium state after passage of a predetermined time, outputting a constant intensity.

When the LED driver 35 supplies a current to the white LED 13A, the white LED 13A emits light diffused in a certain range. The condenser 13B converts light irradiated on itself among the diffused light emitted from the white LED 13A into parallel light rays, and irradiates the biological sample SPL.

The photodetector 13C is disposed at a position where part of the diffused light emitted from the white LED 13A is irradiated among diffused light emitted from the white LED 13A without blocking a light path of light irradiated on the condenser 13B.

And when the photodetector 13C receives part of diffused light emitted from the white LED 13A, the photodetector 13C detects the intensity of the irradiated light, and sends a light-intensity signal S1 in accordance with the light intensity to an integrator 32.

On the other hand, the light-source control section 30 (FIG. 5) includes a system controller 31, the integrator 32, a comparator 33, an AND circuit 34, and an LED driver 35.

The system controller 31 has a computer configuration including a CPU, a ROM storing various programs, etc., and a RAM functioning as a work memory of the CPU, and totally controls individual sections 31 to 35 of the light-source control section 30.

Figure 7:
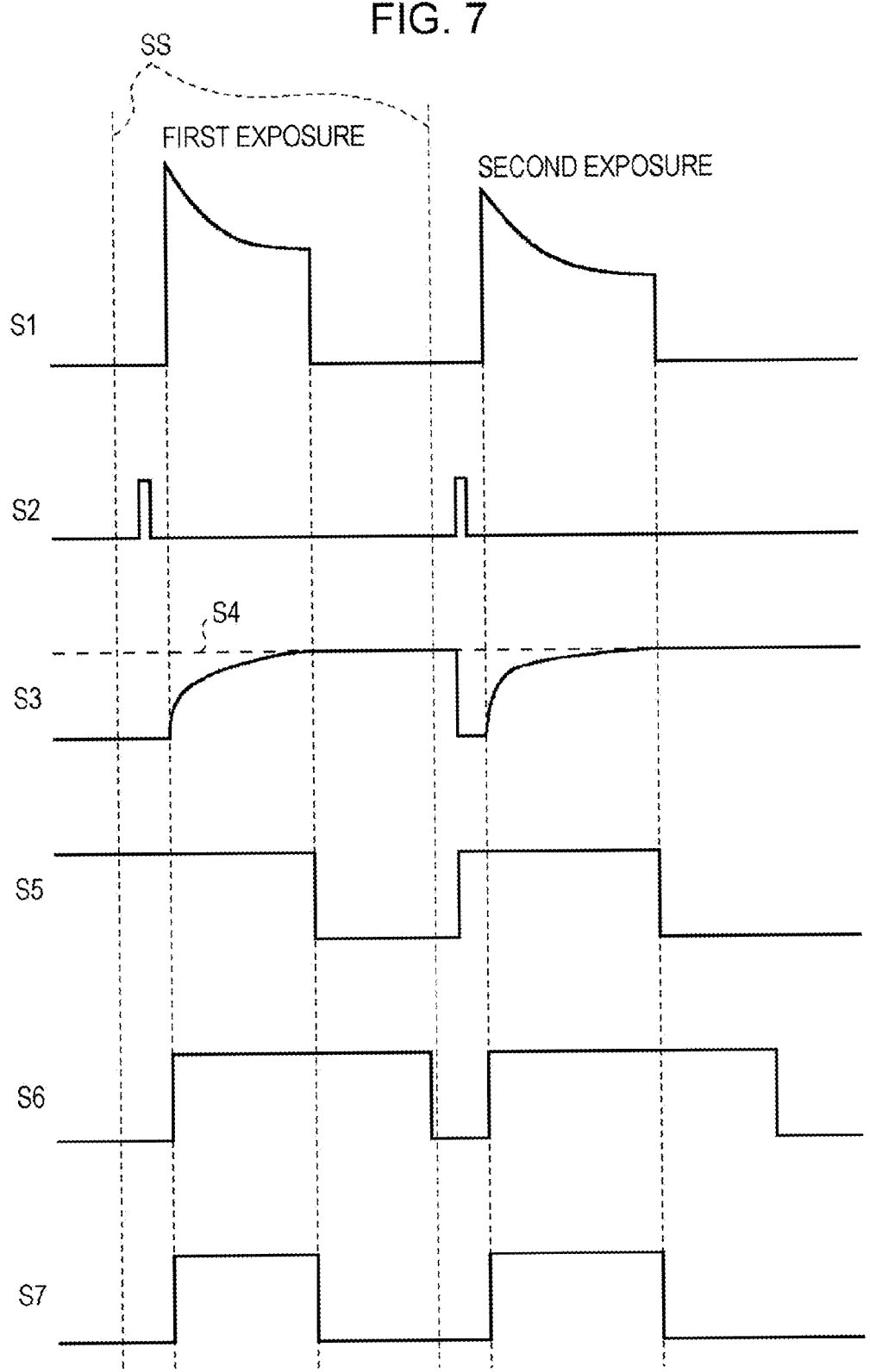
FIG. 7 is a schematic diagram illustrating a timing chart in controlling a light source.

When the data processing section 20 supplies an electronic flash instruction SS to the light-source control section 30, the light-source control section 30 controls light aimed at the biological sample SPL in accordance with a timing chart shown in FIG. 7.

Specifically, when the data processing section 20 supplies the electronic flash instruction SS to the system controller 31, the system controller 31 sends a reset signal S2 to the integrator 32.

Also, the system controller 31 sends a threshold-value signal S4 indicating a predetermined threshold value to the comparator 33.

Further, the system controller 31 outputs a light-emission instruction S6 for instructing the white LED 13A to output light to the AND circuit 34. The light-emission instruction S6 is output for a time period longer than a time period while the white LED 13A should output light, and shorter than a time period at which the next reset signal S2 is output.

When the integrator 32 receives the reset signal S2, the integrator 32 resets an integration value having been integrated up to that time in response to the reset signal S2. And the integrator 32 starts integrating the light intensity in accordance with the light-intensity signal 51 supplied from the photodetector 13C from a point in time of the reset, and sends an integration-value signal S3 indicating the integration value to the comparator 33.

The comparator 33 compares a threshold value indicated by a threshold-value signal S4 supplied from the system controller 31 and an integration value indicated by an integration-value signal S3 supplied from the integrator 32. If the integration value is less than the threshold value, the comparator 33 sends an output signal S5, which causes the white LED 13A to output light, to the AND circuit 34. If the integration value is not less than the threshold value, the comparator 33 does not send an output signal S5, which causes the white LED 13A to output light, to the AND circuit 34.

If the AND circuit 34 is supplied with an output signal S5 from the comparator 33, and a light-emission instruction signal S6 from the system controller 31, the AND circuit 34 sends a light-emission instruction signal S7 for causing the white LED 13A to emit light to the LED driver 35.

If the AND circuit 34 supplies the LED driver 35 with a light-emission instruction signal S7, the LED driver 35 applies a constant current to the white LED 13A so that the white LED 13A emits light.

In this manner, when the light-source control section 30 is supplied with an electronic flash instruction SS from the data processing section 20, the light-source control section 30 controls the white LED 13A to emit light until the integration value of the intensity of light measured by the photodetector 13C reaches the threshold value.

And the light-source control section 30 stops the current to be supplied to the white LED 13A in order to cause the white LED 13A to stop light emission at a point in time when the integration value of the intensity of light measured by the photodetector 13C has reached the threshold value.

Thereby, it is possible for the light-source control section 30 to keep the light quantity emitted from the white LED 13A onto the CMOS image sensor 14 through the condenser 13B for each time the electronic flash instruction SS is supplied from the data processing section 20.

Incidentally, the system controller 31 is allowed to obtain the light-emission instruction signal S7 output from the AND circuit 34, and to output a light-emission-end signal indicating that supplying electricity to the white LED 13A has ended to the data processing section 20 on the basis of the light-emission instruction signal S7.

1.3 Configuration of Data Processing Section

Figure 8:
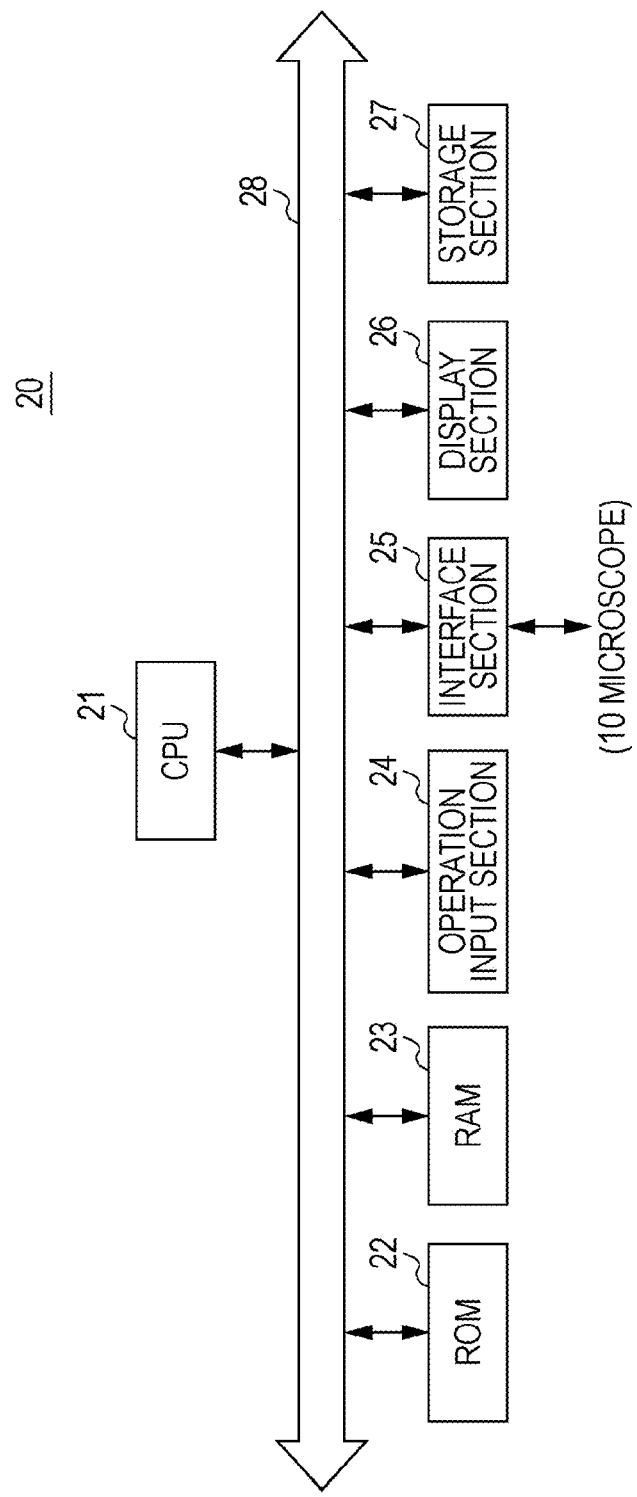
FIG. 8 is a schematic diagram illustrating a configuration of a data processing section.

Next, a description will be given of a configuration of the data processing section 20. As shown in FIG. 8, the data processing section 20 has a configuration in which various kinds of hardware are connected to a CPU (Central Processing Unit) 21 performing control.

Specifically, a ROM (Read Only Memory) 22, a RAM (Random Access Memory) 23 to be a work memory for the CPU 21, an operation input section 24 to which an instruction in accordance with a user's operation is input, an interface section 25, a display section 26, and a storage section 27 are connected through a bus 28.

The ROM 22 stores programs for executing various kinds of processing. The microscope 10 (FIG. 4) is connected to the interface section 25.

A liquid-crystal display, or an EL (Electro Luminescence) display or a plasma display, etc., is employed for the display section 26. Also, a magnetic disk typified by a (Hard Disk), or a semiconductor memory, or an optical disc, etc., is employed for the storage section 27. A portable memory, such as a USB (Universal Serial Bus) memory, or a CF (Compact Flash) memory, etc., may be employed.

The CPU 21 loads a program corresponding to an instruction given from the operation input section 23 among a plurality of programs stored in the ROM 22 into the RAM 23, and suitably controls the display section 26 and the storage section 27 in accordance with the loaded program. Also, the CPU 21 suitably controls individual sections of the microscope 10 through the interface section 25.

1.4 Specific Contents of Biological-Sample-Image Acquisition Processing

When the CPU 21 receives an acquisition instruction of an image of a biological sample SPL from the operation input section 24, the CPU 21 loads a program corresponding to the obtained instruction into the RAM 23.

Figure 9:
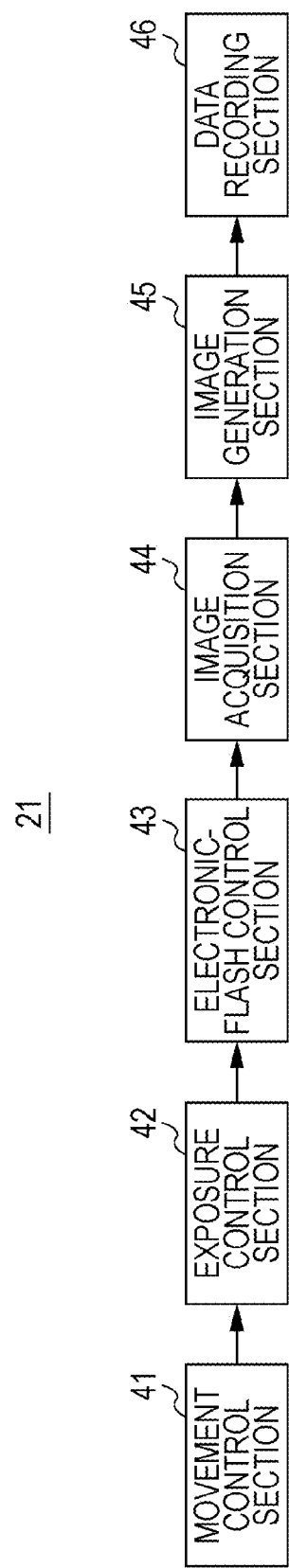
FIG. 9 is a schematic diagram illustrating a functional configuration of a CPU performing biological-sample acquisition processing according to the first embodiment.

As shown in FIG. 9, the CPU 21 functions as a movement control section 41, an exposure control section 42, an electronic-flash control section 43, an image acquisition section 44, an image generation section 45, and a data recording section 46 in accordance with the program corresponding to the acquisition instruction of the image of the biological sample SPL.

Figure 10:
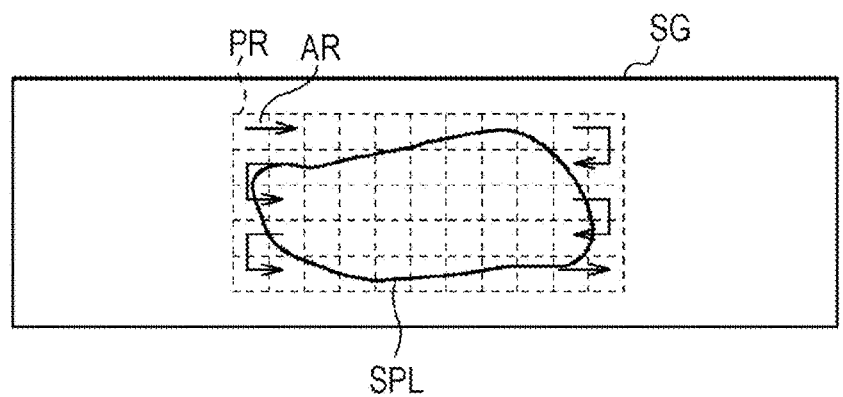
FIG. 10 is a schematic diagram illustrating small areas allocated to a biological sample.

For example, as shown in FIG. 10, the movement control section 41 allocates an area of a biological sample SPL to be imaged (in the following, also referred to as a sample area) PR to a plurality of small areas AR to match magnifications of the objective lens 12A and the imaging lens 12B. In this regard, in FIG. 10, small areas AR are not overlapped one another. However, part of adjacent areas may be overlapped.

And the movement control section 41 moves the movable stage 11 such that an area to be imaged by the CMOS image sensor 14 becomes, for example, a small area AR on the upper-left corner among a plurality of small areas AR.

After the movement control section 41 performed movement so that the upper-left small area AR became an area to be imaged, the exposure control section 42 starts the CMOS image sensor 14 to be exposed.

After the exposure control section 42 started the exposure of the CMOS image sensor 14, preferably at a point in time when the exposure is started, the electronic-flash control section 43 outputs the electronic flash instruction SS to the light-source control section 30. When the electronic flash instruction SS is supplied by the electronic-flash control section 43, the light-source control section 30 causes the white LED 13A to emit a certain amount of light as described above.

After the electronic-flash control section 43 outputs the electronic flash instruction SS, and the system controller 31 supplied the light-emission-end signal, preferably at a point in time when a light-emission-end signal is supplied, the exposure control section 42 stops the exposure of the CMOS image sensor 14.

The image acquisition section 44 reads out an electronic signal of each pixel of the CMOS image sensor 14 in sequence for each scanning line, and obtains an image of the biological-sample SPL member of the small area AR obtained as a result as a divided image.

Figure 11:
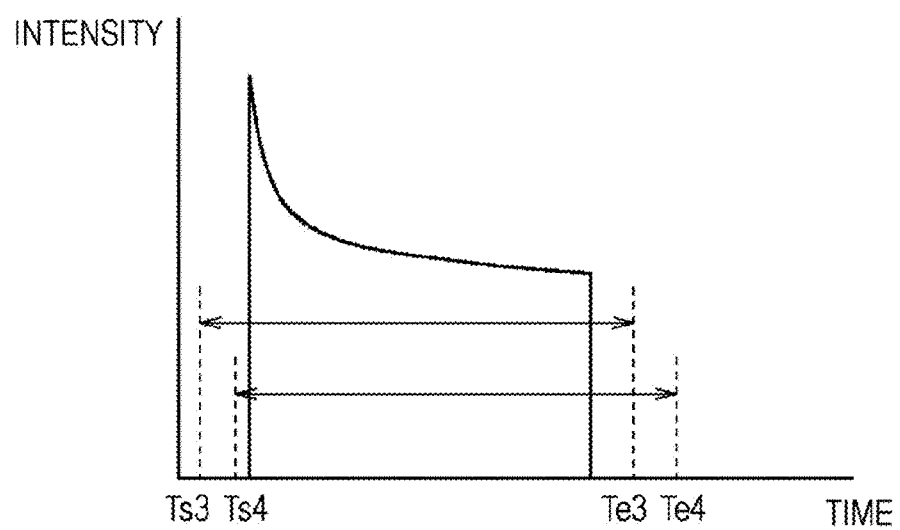
FIG. 11 is a graph illustrating a relationship between light intensity and exposure time according to the first embodiment.

Accordingly, as shown in FIG. 11, after exposure of all the pixels of the CMOS image sensor 14 has been started, the exposure control section 42 and the electronic-flash control section 43 cause the white LED 13A to emit light. And after the exposure control section 42 and the electronic-flash control section 43 have caused the white LED 13A to emit a certain amount of light, the exposure control section 42 and the electronic-flash control section 43 terminate the exposure of all the pixels of the CMOS image sensor 14.

In this regard, in FIG. 11, time Ts3 indicates exposure start time of a scanning line on which exposure is started first, and time Ts4 indicates exposure start time of a scanning line on which exposure is started last. Also, time Te3 indicates exposure end time of the scanning line corresponding to time Ts3, and time Te4 indicates exposure end time of the scanning line corresponding to time Ts4.

The movement control section 41 causes the image acquisition section 44 to read out an electronic signal of the CMOS image sensor 14, and at the same time, moves the movable stage 11 such that the next area to be imaged by the CMOS image sensor 14 becomes, for example, a small area AR on the right of the upper-left small area AR.

The exposure control section 42 and the electronic-flash control section 43 cause the CMOS image sensor 14 to start being exposed, and outputs the electronic flash instruction SS to the light-source control section 30 to cause the white LED 13A to emit a certain amount of light. After that, the exposure control section 42 and the electronic-flash control section 43 ends the exposure of the CMOS image sensor 14. Also, the image acquisition section 44 obtains the divided images from the CMOS image sensor 14.

In this manner, the movement control section 41 moves an area to be imaged by the CMOS image sensor 14 in sequence from a small area AR of the uppermost left end to that of the right end. Next, the movement control section 41 moves downward by one row, and moves in sequence from the right end to the left end. In this manner, the movement control section 41 moves the area to be imaged in the opposite direction alternately for each row until the divided images corresponding to all the small areas AR are obtained.

And the exposure control section 42, the electronic-flash control section 43, and the image acquisition section 44 function in the same manner as described above, and obtain the divided image in the small area AR each time the area to be imaged is moved to one of the small areas AR by the movement control section 41.

The image generation section 45 combines a plurality of divided images obtained by the image acquisition section 44 to generate a biological sample image.

When the biological sample image is generated, the data recording section 46 generates sample data including image information indicating the entire biological sample image or a part of the image that can restore the biological sample image.

And the data recording section 46 adds data indicating identification information on the biological sample image to the sample data, and records the sample data with that data into the storage section 27.

The identification information includes information such as, an examinee name, an examinee gender, an examinee age, and an acquisition date, etc., of the biological sample SPL, for example. The data recording section 46 informs that the identification information should be input at predetermined timing, such as at the timing when a data storage instruction of the biological sample SPL is given, at the timing when the microscope slide SG should be set, etc.

Also, if identification information has not been obtained at the time when biological sample data is created, the data recording section 46 gives a warning that the identification information should be input. In this regard, a notification or a warning that the identification information should be input is given, for example, by sound or through a GUI (Graphical User Interface) screen, etc.

1.5 Biological-Sample-Image Acquisition Processing Procedure

Figure 12:
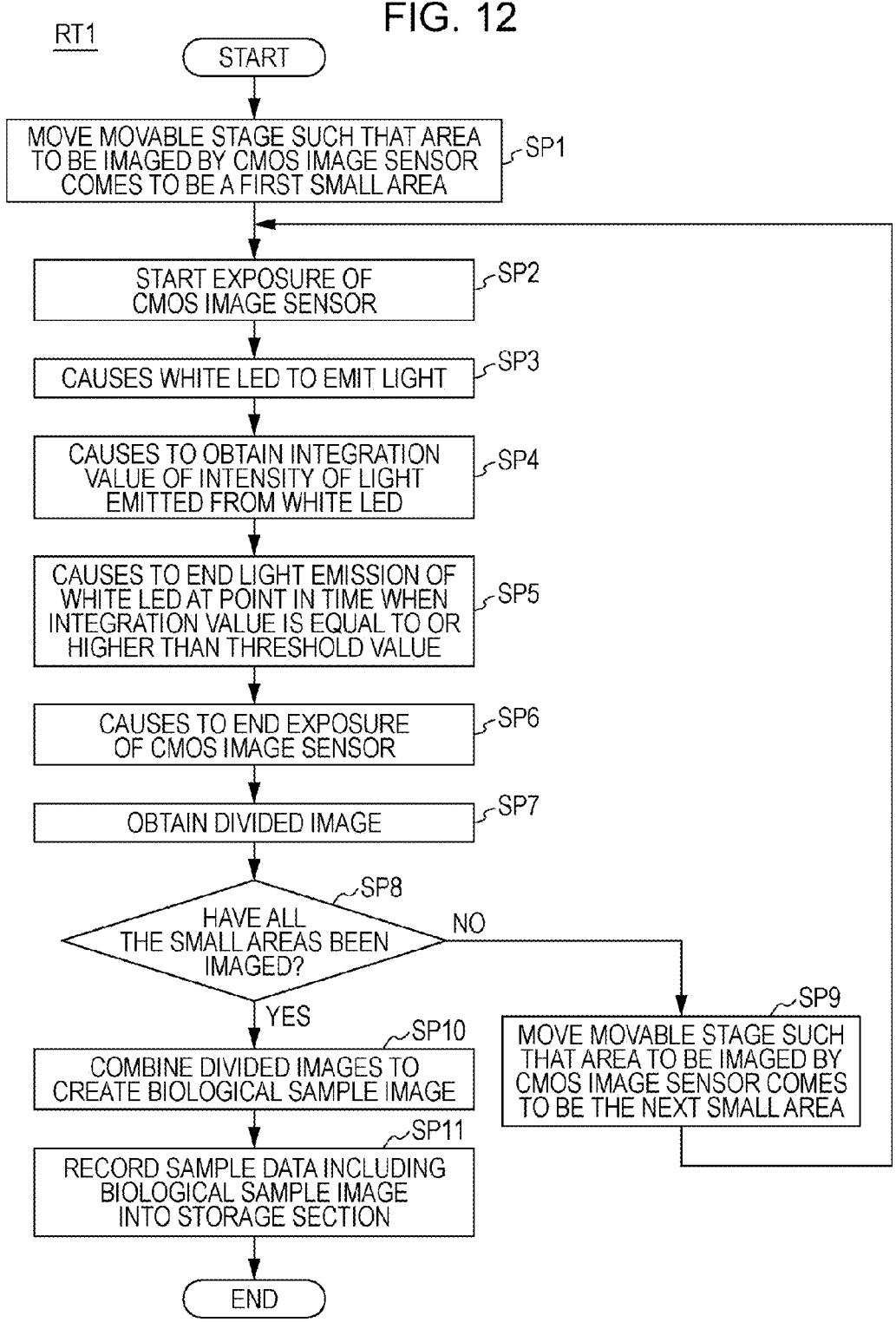
FIG. 12 is a flowchart illustrating a biological-sample-image acquisition processing procedure according to the first embodiment.

Next, a description will be given the above-described biological-sample-image acquisition processing procedure in accordance with a flowchart shown in FIG. 12.

Actually, the CPU 21 enters a routine RT1 from a start step, and proceeds to the next step SP1. In step SP1, the CPU 21 allocates a sample area PR to a plurality of small areas AR, and moves the movable stage 11 such that an area to be imaged by the CMOS image sensor 14 is a first (upper left) small area AR, and the processing proceeds to the next step SP2.

In step SP2, the CPU 21 starts exposure of the CMOS image sensor 14, and the processing proceeds to the next step SP3.

In step SP3, the CPU 21 outputs an electronic flash instruction SS to the light-source control section 30 to cause the white LED 13A to emit light, then in the next step SP4, obtains an integration value of the intensity of light emitted from the white LED 13A, and the processing proceeds to the next step SP5.

In step SP5, at the point in time when the integration value becomes a threshold value or higher, the CPU 21 causes the light-source control section 30 to end light emission from the white LED 13A, and the processing proceeds to the next step SP6.

In step SP6, the CPU 21 ends the exposure on the CMOS image sensor 14, and processing proceeds to the next step SP7.

In step SP7, the CPU 21 reads out an electronic signal of each pixel of the CMOS image sensor 14 in sequence for each line, obtains a divided image as a result, and the processing proceeds to the next step SP8.

In step SP8, the CPU 21 determines whether all the small areas AR have been imaged. If a negative result is obtained, it means that there is a small area AR yet to be imaged, and thus the processing proceeds to the next step SP9.

In step SP9, the CPU 21 moves the movable stage 11 such that an area to be imaged by the CMOS image sensor 14 becomes the next small area AR, and the processing returns to step SP2.

The CPU 21 repeats from step SP2 to step SP9 until an affirmative result is obtained in step SP8. When the affirmative result is obtained, it means that divided images corresponding to all the small areas AR have been obtained, and the processing proceeds to step SP10.

In step SP10, the CPU 21 combines the divided images to generate a biological sample image, then in the next step SP11, stores the sample data including the biological sample image into the storage section 27, and the processing proceeds to the next step to end the processing.

1.6 Operation and Advantages

In the above-described configuration of the biological-sample-image acquisition apparatus 1, light from the white LED 13A is irradiated on small areas AR individually allocated to sample area PR including a biological sample SPL to be imaged.

In the biological-sample-image acquisition apparatus 1, the photodetector 13C detects intensity of light emitted from the white LED 13A, the light intensity is integrated by the integrator 32, and light emission from the white LED 13A is ended at the time when the integration value becomes a threshold value or higher.

In the biological-sample-image acquisition apparatus 1, exposure on the CMOS image sensor 14 is started before the white LED 13A emits light, and exposure on the CMOS image sensor 14 is ended after light emission from the white LED 13A is ended.

And in the biological-sample-image acquisition apparatus 1, an image of a small area AR is obtained from the CMOS image sensor 14 as a divided image.

Thereby, in the biological-sample-image acquisition apparatus 1, when all the divided images are individually obtained, the amount of light emitted from the white LED 13A can be kept constant. Thus, it is possible to keep an exposure quantity on the CMOS image sensor 14 constant when each of the small areas AR is imaged.

Accordingly, in the biological-sample-image acquisition apparatus 1, when divided images of all the small area AR are obtained, and these divided images are combined into one piece of a biological sample image, even if the intensity of light of the white LED 13A varies, luminance differences among all the divided images can be reduced.

Also, in the biological-sample-image acquisition apparatus 1, it is not necessary to start imaging after the white LED 13A goes into a thermal equilibrium state, and thus the imaging period can be shortened by that amount of time.

Incidentally, in the case of employing an imaging device which performs starting exposure, ending exposure, and reading out an electronic signal for each line, such as a CMOS image sensor 14, a time difference arises for each line in starting exposure, ending exposure, and reading out the electronic signal.

However, in the biological-sample-image acquisition apparatus 1, exposure of all the pixels of the CMOS image sensor 14 is started before the white LED 13A emits light, and exposure of all the pixels of the CMOS image sensor 14 is ended after the white LED 13A has ended light emission.

Thereby, in the biological-sample-image acquisition apparatus 1, in the case of employing an imaging device which performs starting exposure, ending exposure, and reading out an electronic signal for each line, such as a CMOS image sensor 14, it is possible to obtain divided images without having luminance difference for each line.

Incidentally, in the biological-sample-image acquisition apparatus 1, a method is considered in which the white LED 13A emits light all the time, and exposure quantity of the CMOS image sensor 14 is kept constant by opening and closing a mechanical shutter disposed on a light path of the light.

In this method, in general, since a life span of a mechanical shutter is from 100 thousand times to one million times, if this method is employed in the biological-sample-image acquisition apparatus 1 capturing hundreds of divided images in one minute, the mechanical shutter reaches the life span in about three days.

In contrast, in the biological-sample-image acquisition apparatus 1, exposure quantity of the CMOS image sensor 14 is kept constant by the emission control of the white LED 13A, and thus it is more advantageous in maintainability and in economical efficiency than the case of disposing a mechanical shutter.

Also, for another method, a method is considered in which the white LED 13A is controlled at a constant intensity by so-called APC (Auto Power Control) in order to keep the exposure quantity of the CMOS image sensor 14 constant.

By this method, it is possible to keep the light intensity constant in a shorter time than the time period in which the white LED 13A goes into a thermal equilibrium state. However, it is necessary to design a control band to be a high band so that the APC can sufficiently respond in an electronic-flash emission time in this method. In particular, in the case of using an LED driver having a high-efficiency output format, such as a PWM (Pulse Width Modulation) method, etc., a control band of an LED current is restricted by a PWM carrier frequency, and thus it is difficult to achieve APC having a high response speed.

In contrast, in the biological-sample-image acquisition apparatus 1, the amount of light emitted from the white LED 13A is kept constant. Accordingly, it is not necessary to wait for intensity of light emitted from the white LED 13A to become constant, and the imaging period can be shortened by that period. Also, even if an LED current pulsates by the PWM method, the amount of light can be correctly kept constant.

With the above arrangement, in the biological-sample-image acquisition apparatus 1, exposure of the CMOS image sensor 14 on a small area AR allocated on a sample area PR is started before the white LED 13A emits light. Also, in the biological-sample-image acquisition apparatus 1, exposure of the CMOS image sensor 14 is ended to obtain a divided image after the white LED 13A has emitted a certain amount of light.

Thereby, in the biological-sample-image acquisition apparatus 1, it is possible to keep the exposure quantity of the CMOS image sensor 14 constant without waiting for the white LED 13A to go into a thermal equilibrium state. Thus, it is possible to shorten an imaging period, and to reduce luminance differences among the divided images.

2. Second Embodiment

In a second embodiment, the functional configurations of the light-source control section and the CPU are different from those of the first embodiment. In this regard, the configurations of the biological-sample-image acquisition apparatus 1 and the data processing section 20 are the same as those of the first embodiment, and the descriptions thereof will be omitted.

2.1 Configurations of Light-Source Unit and Light-Source Control Section

Figure 5:
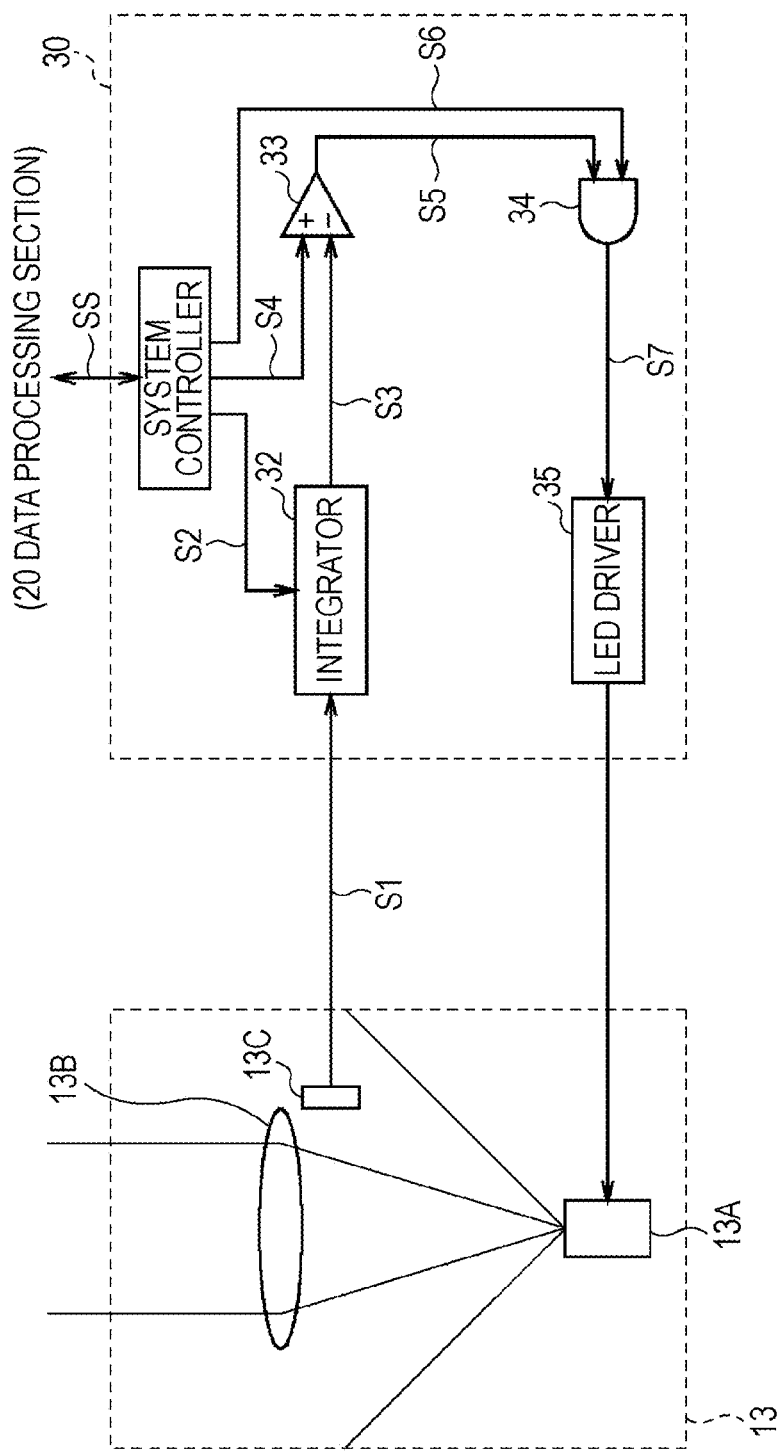
FIG. 5 is a schematic diagram illustrating configurations of a light-source unit and a light-source control section according to a first embodiment.
Figure 13:
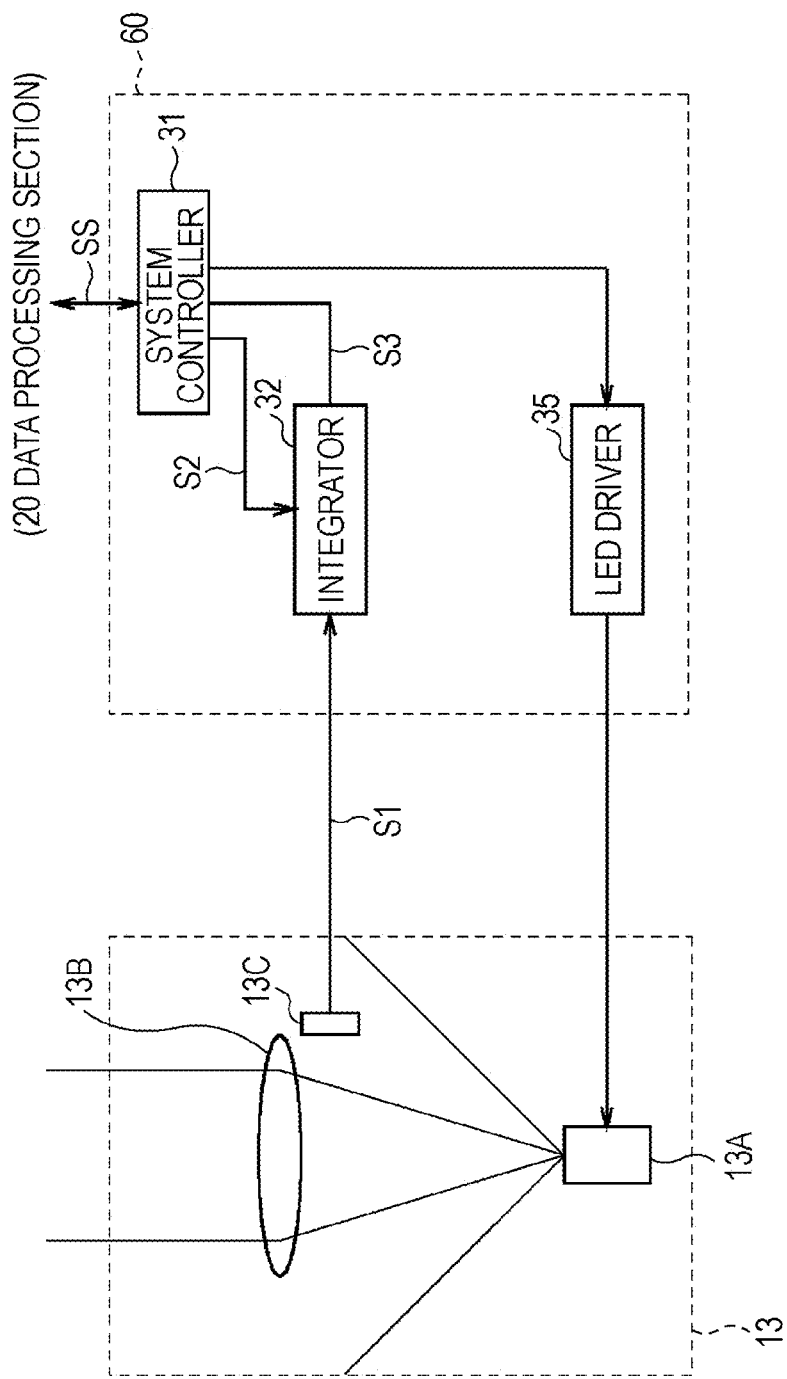
FIG. 13 is a schematic diagram illustrating configurations of a light-source unit and a light-source control section according to a second embodiment.

As shown in FIG. 13, in which the same reference letters and numerals are given as the corresponding parts of FIG. 5, a light-source control section 60 includes a system controller 31, an integrator 32, and an LED driver 35. The system controller 31 suitably controls the integrator 32 and the LED driver 35.

When the LED driver 35 supplies a current to the white LED 13A, the white LED 13A emits light diffused in a certain range. When part of diffused light emitted from the white LED 13A is irradiated on the photodetector 13C, the photodetector 13C measures the intensity of the irradiated light, and sends the light-intensity signal 51 in accordance with the light intensity to the integrator 32.

When the data processing section 20 supplies the electronic flash instruction SS to the system controller 31, the system controller 31 sends the reset signal S2 to the integrator 32.

When the integrator 32 receives the reset signal S2, the integrator 32 resets an integration value having been integrated up to that time in response to the reset signal S2. And the integrator 32 integrates the light intensity in accordance with the light-intensity signal 51 supplied from the photodetector 13C from a point in time of the reset.

After the system controller 31 sends the reset signal S2 to the integrator 32, the system controller 31 outputs a light-emission instruction signal S11 for causing the white LED 13A to emit light to the LED driver 35 during a certain time period set to be a same interval all the time from an emission start to an emission end.

When the system controller 31 supplies the LED driver 35 with the light-emission instruction signal S11, the LED driver 35 applies a constant current to the white LED 13A for a certain time period so that the white LED 13A emits light for a certain time period.

The integrator 32 integrates the intensity of light emitted from the white LED 13A for a certain time period from a point in time of reset, and sends an integration-value signal S3 indicating the integration value obtained as a result to the system controller 31.

In this manner, when the light-source control section 30 is supplied with an electronic flash instruction SS from the data processing section 20, the light-source control section controls the white LED 13A to emit light for a certain time period, and the light-source control section 30 obtains the integration value of the intensity of light emitted from the white LED 31A during that time.

2.2 Specific Contents of Biological-Sample-Image Acquisition Processing

When the CPU 21 receives an acquisition instruction of an image of a biological sample SPL from the operation input section 24, the CPU 21 loads a program corresponding to the obtained instruction into the RAM 23.

Figure 14:
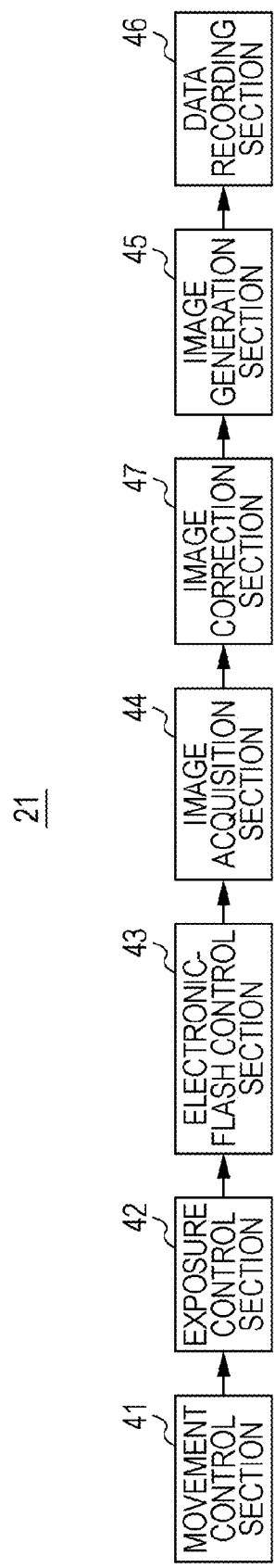
FIG. 14 is a schematic diagram illustrating a functional configuration of a CPU performing biological-sample acquisition processing according to the second embodiment.

As shown in FIG. 14, the CPU 21 functions as the movement control section 41, the exposure control section 42, the electronic-flash control section 43, the image acquisition section 44, the image correction section 47, the image generation section 45, and the data recording section 46 in accordance with the program corresponding to the acquisition instruction of the image of the biological sample SPL.

The movement control section 41 allocates a sample area PR to a plurality of small areas AR, and moves the movable stage 11 such that an area to be imaged by the CMOS image sensor 14 becomes, for example, a small area AR on the upper-left corner among a plurality of small areas AR.

After the movement control section 41 performed movement so that the upper-left small area AR became an area to be imaged, the exposure control section 42 starts the CMOS image sensor 14 to be exposed.

After the exposure control section 42 started the exposure of the CMOS image sensor 14, preferably at a point in time when the exposure of the CMOS image sensor 14 is started, the electronic-flash control section 43 outputs the flash instruction SS to the light-source control section 60. When the electronic flash instruction SS is supplied by the electronic-flash control section 43, the light-source control section 60 causes the white LED 13A to emit light for a certain time period.

After the light emission from the white LED 13A is ended by the light-source control section 60, the exposure control section 42 ends exposure of the CMOS image sensor 14 preferably at a point in time when light emission is ended.

The image acquisition section 44 reads out an electronic signal of each pixel of the CMOS image sensor 14 in sequence for each line, and obtains an image of the biological-sample SPL member of the upper-left small area AR obtained as a result as a divided image.

At this time image, when the acquisition section 44 obtains the divided image of the upper-left small area AR, the acquisition section 44 obtains the integration-value signal S3 indicating the integration value of the intensity of the light irradiated by the white LED 13A for a certain time period.

When a divided image is obtained, the movement control section 41 moves the movable stage 11 to the next small area AR. And the exposure control section 42, the electronic-flash control section 43, and the image acquisition section 44 obtain a divided image and an integration-value signal S3 of the small area AR by functioning in the same manner as described above each time the movement control section 41 moves the movable stage 11 to any small area AR.

The image correction section 47 calculates a magnification for matching the integration value indicated by the integration-value signal S3 with a predetermined value, and multiplies the calculated magnification and the luminance value of the divided image corresponding to the integration value so as to correct the luminance value of the divided image.

The image correction section 47 corrects the luminance values for all the divided images in the same manner. Also, the image correction section 47 performs distortion correction that corrects distortions of all the divided images.

The image generation section 45 combines the divided images corrected by the image correction section 47 to generate a biological sample image. When the biological sample image is generated, the data recording section 46 generates sample data including image information indicating the entire biological sample image or a part of the image that can restore the biological sample image.

2.3 Biological-Sample-Image Acquisition Processing Procedure

Figure 15:
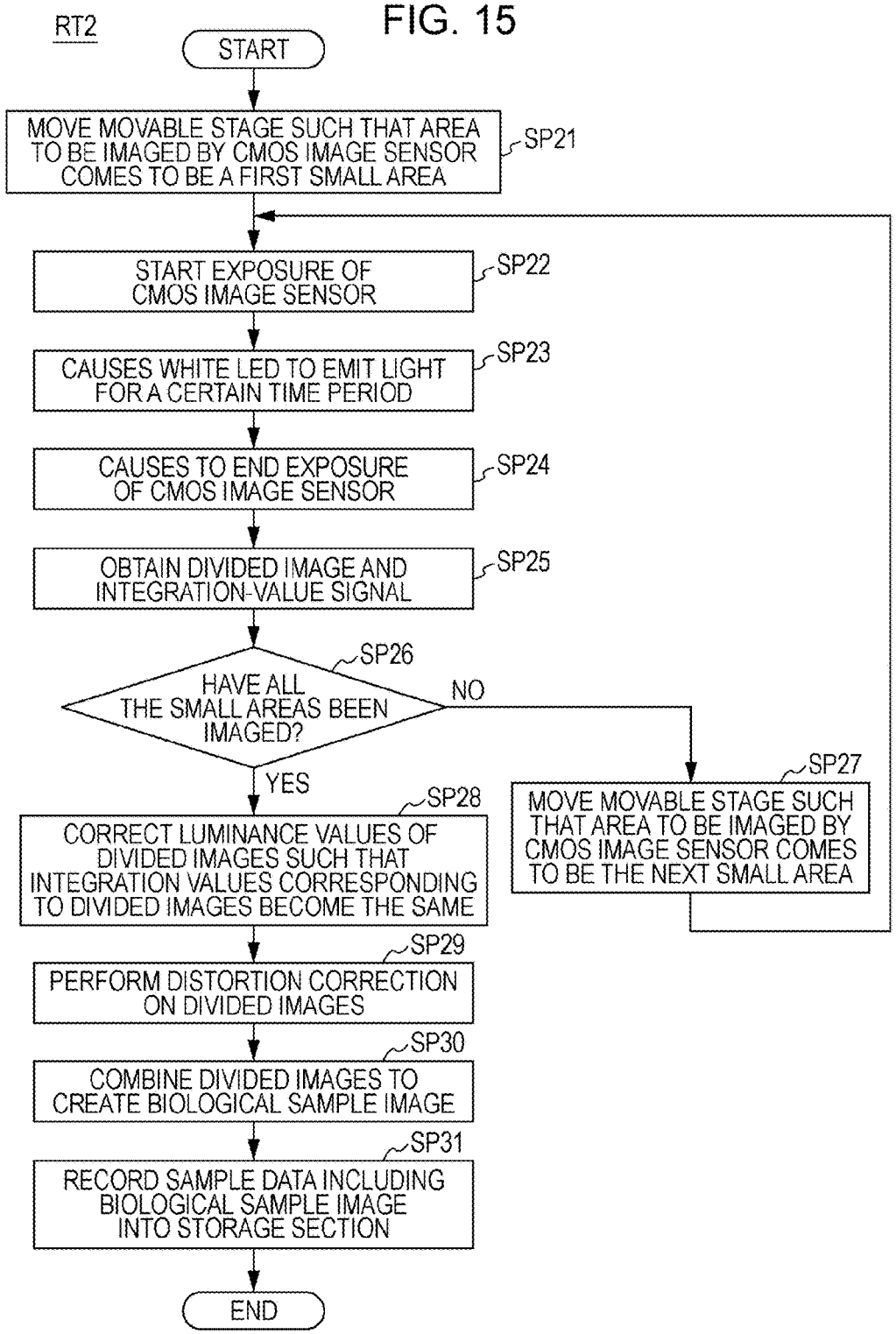
FIG. 15 is a flowchart illustrating a biological-sample-image acquisition processing procedure according to the second embodiment.

Next, a description will be given the above-described biological-sample-image acquisition processing procedure in accordance with a flowchart shown in FIG. 15.

Actually, the CPU 21 enters a routine RT2 from a start step, and proceeds to the next step SP21. In step SP21, the CPU 21 allocates a sample area PR to a plurality of small areas AR, and moves the movable stage 11 such that an area to be imaged by the CMOS image sensor 14 is a first imaging area AR, and the processing proceeds to the next step SP22.

In step SP22, the CPU 21 starts exposure of the CMOS image sensor 14, and the processing proceeds to the next step SP23.

In step SP23, the CPU 21 outputs an electronic flash instruction SS to the light-source control section 60 to cause the white LED 13A to emit light for a certain time period and by a constant current, and the processing proceeds to the next step SP24.

In step SP24, the CPU 21 ends the exposure on the CMOS image sensor 14, and processing proceeds to the next step SP25.

In step SP25, the CPU 21 reads out an electronic signal of each pixel of the CMOS image sensor 14 in sequence for each line, obtains a divided image as a result, also obtains an integration value signal S3 corresponding to the divided image, and the processing proceeds to the next step SP26.

In step SP26, the CPU 21 determines whether all the small areas AR have been imaged. If a negative result is obtained, it means that there is a small area AR yet to be imaged, and thus the processing proceeds to the next step SP27.

In step SP27, the CPU 21 moves the movable stage 11 such that an area to be imaged by the CMOS image sensor 14 becomes the next small area AR, and the processing returns to step SP22.

The CPU 21 repeats from step SP22 to step SP27 until an affirmative result is obtained in step SP26. When the affirmative is obtained, it means that divided images and the integration value signals S3, which correspond to all the small areas AR, have been obtained, and the processing proceeds to step SP28.

In step SP28, the CPU 21 calculates magnifications for matching the integration values indicated by the integration-value signals S3 individually corresponding to all the divided images with a predetermined value set in advance, multiplies the magnifications and the luminance values of the divided images so as to correct the luminance values of the divided images, respectively, and the processing proceeds to the next step SP29.

In step SP29, the CPU 21 performs distortion correction on the divided images having been subjected to the luminance-value correction. In the next step SP30, the CPU 21 combines the divided images into a biological sample image, and the processing proceeds to the next step SP31.

In step SP31, the CPU 21 stores the sample data including the biological sample image into the storage section 27, and the processing proceeds to the next step to end the processing.

2.4 Operation and Advantages

In the above-described configuration of the biological-sample-image acquisition apparatus 1, light from the white LED 13A is irradiated for a certain time period on small areas AR individually allocated to sample area PR including a biological sample SPL to be imaged.

In the biological-sample-image acquisition apparatus 1, the photodetector 13C detects intensity of light emitted from the white LED 13A, and the light intensity is integrated by the integrator 32 from a point in time when light is emitted.

In the biological-sample-image acquisition apparatus 1, exposure on the CMOS image sensor 14 is started before the white LED 13A emits light, and exposure on the CMOS image sensor 14 is ended after light emission from the white LED 13A is ended.

And in the biological-sample-image acquisition apparatus 1, an image of a small area AR is obtained from the CMOS image sensor 14 as a divided image, and an integration value corresponding to each of the divided images is obtained.

And in the biological-sample-image acquisition apparatus 1, luminance values of the divided images are corrected so that the integration values become constant, and the corrected divided images are combined into a biological sample image.

Thereby, in the biological-sample-image acquisition apparatus 1, it is possible to keep exposure time of the CMOS image sensor 14 constant when a small area AR is imaged, and to correct the luminance value of a divided image using the integration value corresponding to the exposure quantity at that time. Thus, it is possible to reduce the luminance differences among the divided images.

Also, in the biological-sample-image acquisition apparatus 1, it is not necessary to start imaging after the white LED 13A goes into a thermal equilibrium state, and thus the imaging period can be shortened by that amount of time.

Further, in the biological-sample-image acquisition apparatus 1, even in the case of employing an imaging device which performs starting exposure, ending exposure, and reading out an electronic signal for each line, such as a CMOS image sensor 14, it is possible to obtain divided images without having a difference in the luminance value for each line.

Also, in the biological-sample-image acquisition apparatus 1, light emission time from the white LED 13A is kept constant, and thus it is possible to keep the emission time of the white LED 13A and the exposure time of the CMOS image sensor 14 constant all the time.

Accordingly, in the biological-sample-image acquisition apparatus 1, the timings of the movement control of the movable stage 11, the emission control of the white LED 13A, and the exposure control of the CMOS image sensor 14 are not changed for each small area AR compared with controlling the exposure quantity at a certain amount as in the case of the first embodiment. Thus, in the biological-sample-image acquisition apparatus 1, the timings for the movement control, the emission control, and the exposure control can be made easily.

Incidentally, as a method for correcting the luminance values, a method is considered in which the average values of the luminance values of a plurality of divided images are individually calculated, and the luminance values of the plurality of divided images are corrected so that the average values become the same. However, by this method, the average values of the luminance values of all the divided images become the same.

Accordingly, by this method, there are cases where it is difficult to correct the luminance value in the same manner as the case of capturing a plurality of divided images with the same exposure quantity. For example, there are cases where the luminance values become the same as to a part including a biological sample SPL and as to a part not including the biological sample SPL, etc. Accordingly, by this method, there arises a problem in which joints of the divided images DP become conspicuous.

In contrast, in the biological-sample-image acquisition apparatus 1, the luminance values of the divided image are corrected so that the integration values become constant. Accordingly, it is possible to correct the luminance value in the same manner as the case of capturing a plurality of divided images with the same exposure quantity, and thus joints of the divided images become inconspicuous.

With the above arrangement, in the biological-sample-image acquisition apparatus 1, exposure of the CMOS image sensor 14 on a small area AR allocated on a sample area PR is started before the white LED 13A emits light. Also, in the biological-sample-image acquisition apparatus 1, exposure of the CMOS image sensor 14 is ended to obtain a divided image after the white LED 13A has emitted light for a certain time period.

And in the biological-sample-image acquisition apparatus 1, the luminance values of the divided images are corrected such that the integration value of the intensities of light emitted from the white LED 13A become the same, and then the divided images are combined into a biological sample image. Thereby, it is possible for the biological-sample-image acquisition apparatus 1 to shorten the imaging time period, and to reduce the luminance differences among the divided images.

3. Other Embodiments

In this regard, in the above-described first embodiment, a description has been given of the case where the amount of light emitted from the light-source unit 13, in the bright-field mode, onto all the small areas AR is made constant. However, the present application is not limited to this, and the amount of excitation light emitted in the dark-field mode may be made constant.

In this case, the biological-sample-image acquisition apparatus in the dark-field mode is provided with a photodetector measuring the intensity of excitation light emitted from a excitation-light-source system, and a light-source control section receiving the light-intensity signal sent from the photodetector and controlling the excitation-light-source system.

Also, the excitation-light-source system may include a case of disposing one excitation light source emitting excitation light having a plurality of wavelengths, or a case of disposing a plurality of excitation light sources each of which emits one excitation wavelength.

Figure 16:
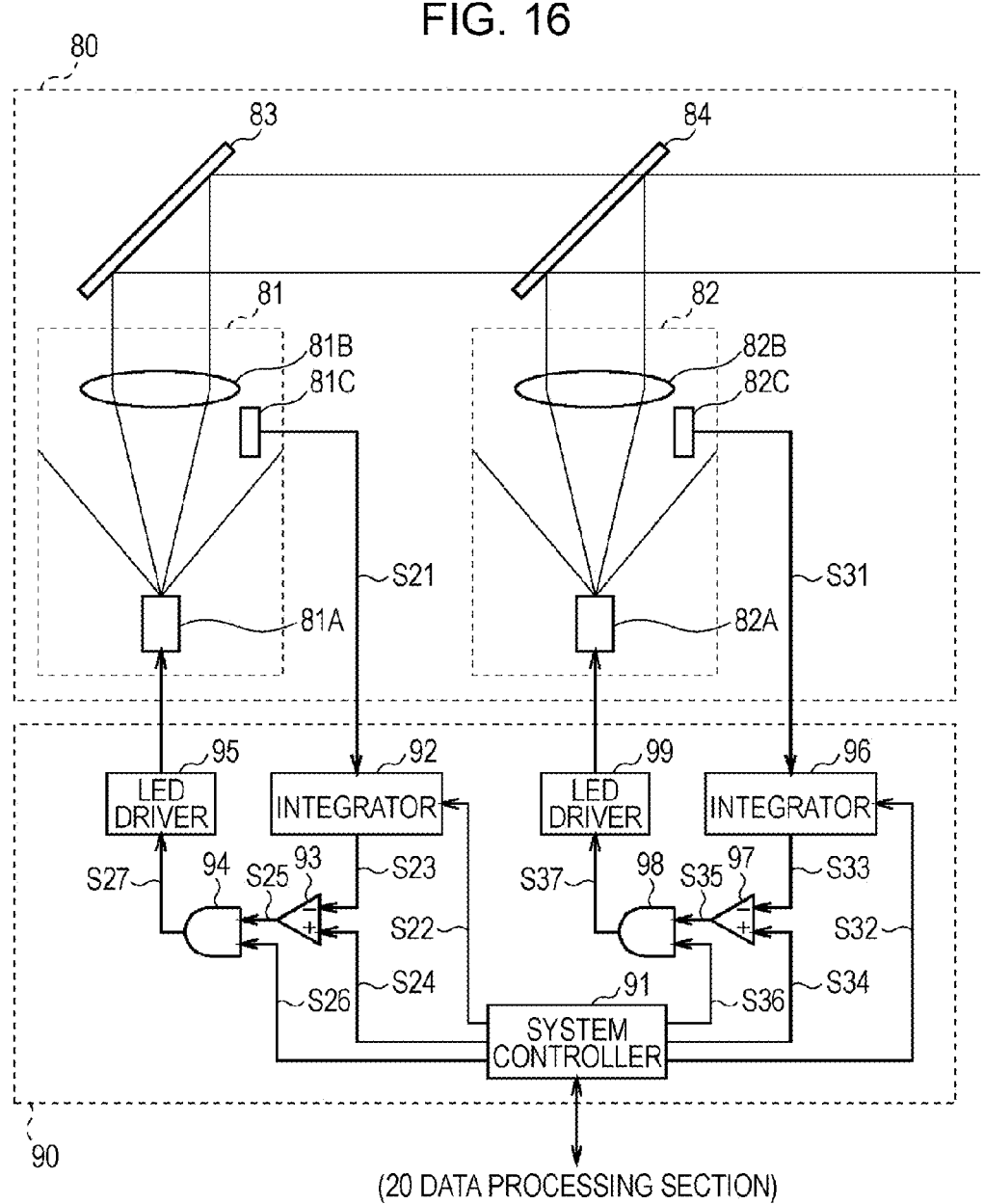
FIG. 16 is a schematic diagram illustrating a functional configuration of a CPU performing biological-sample acquisition processing according to another embodiment.

For one example, a description will be given of the case of disposing a plurality of excitation light sources. The biological-sample-image acquisition apparatus 100 (FIG. 4) is provided with, for example, an excitation-light-source system 80 and a light-source-control section 90 as shown in FIG. 16 in place of the excitation-light source system 15 and the light-source control section 30. In this regard, in this case, it is assumed that a biological sample SPL has been subjected to fluorescence staining.

The excitation-light-source system 80 includes light-source units 81 and 82, a reflecting mirror 83, and a dichroic mirror 84. The light-source units 81 and 82 include excitation-light source LEDs 81A and 82A, which emit light having individually different wavelengths, condensers 81B and 82B, and photodetectors 81C and 82C, respectively.

The light-source control section 90 includes a system controller 91, an integrator 92, a comparator 93, an AND circuit 94, an LED driver 95, an integrator 96, a comparator 97, an AND circuit 98, and an LED driver 99. The system controller 91 totally controls individual sections 91 to 99 of the light-source control section 90.

When the LED driver 95 supplies a current to the excitation-light source LED 81A, the excitation-light source LED 81A emits light diffused in a certain range. The condenser 81B converts light irradiated on itself among the diffused light emitted from the excitation-light source LED 81A into parallel light rays, and the parallel light is reflected on a reflecting mirror 83. The light reflected from the reflecting mirror 83 is transmitted through a dichroic mirror 84, and is irradiated on the biological sample SPL through the excitation filter 16, the dichroic mirror 12C, and the objective lens 12A.

When the LED driver 99 supplies a current to the excitation-light source LED 82A, the excitation-light source LED 82A emits light diffused in a certain range. The condenser 82B converts light irradiated on itself among the diffused light emitted from the excitation-light source LED 82A into parallel light rays, and the parallel light is reflected on a dichroic mirror 84. The light reflected from the dichroic mirror 84 is irradiated on the biological sample SPL through the excitation filter 16, the dichroic mirror 12C, and the objective lens 12A.

When the photodetectors 81C and 82C receive part of diffused light emitted from the excitation-light source LEDs 81A and 82A, respectively, the photodetectors 81C and 82C detect the intensities of the irradiated light, and send light-intensity signals S21 and S31 in accordance with the light intensities to the integrators integrator 92 and 96, respectively.

When the data processing section 20 supplies an electronic flash instruction SS to the system controller 91, the system controller 91 sends reset signals S22 and S32 to the integrators 92 and 96, respectively. Also, the system controller 91 sends threshold-value signals S24 and S34 indicating predetermined threshold values to the comparators 93 and 97, respectively.

Further, the system controller 91 sends reset signals S22 and S32 to the integrators 92 and 96, respectively, and then outputs the light-emission instructions S26 and S36 for instructing the excitation light source LEDs 81A and 82A to output light. The light-emission instructions S26 and S36 are set for a time period longer than a time period while the excitation light source LEDs 81A and 82A should outputs light.

When the integrator 92 receives the reset signal S22, the integrator 92 resets an integration value, the integrator 92 starts integrating the light intensity in accordance with the light-intensity signal S21 supplied from the photodetector 81C from a point in time of the reset, and sends an integration-value signal S23 indicating the integration value to the comparator 93.

The comparator 93 compares a threshold value indicated by a threshold-value signal S24 and an integration value indicated by an integration-value signal S23. If the integration value is less than the threshold value, the comparator 93 sends an output signal S25, which causes the excitation light source LED 81A to output light, to the AND circuit 94.

If the AND circuit 94 is supplied with an output signal S25 from the comparator 93, and a light-emission instruction signal S26 from the system controller 91, the AND circuit 94 sends a light-emission instruction signal S27 for causing the excitation light source LED 81A to emit light to the LED driver 95.

If the AND circuit 94 supplies the LED driver 95 with a light-emission instruction signal S27, the LED driver 95 applies a constant current to the excitation light source LED 81A so that the excitation light source LED 81A emits light.

On the other hand, when the integrator 96 receives the reset signal S32, the integrator 96 resets an integration value, the integrator 96 starts integrating the light intensity in accordance with the light-intensity signal S31 supplied from the photodetector 82C from a point in time of the reset, and sends an integration-value signal S33 indicating the integration value to the comparator 97.

The comparator 97 compares a threshold value indicated by a threshold-value signal S34 and an integration value indicated by an integration-value signal S33. If the integration value is less than the threshold value, the comparator 97 sends an output signal S35, which causes the excitation light source LED 82A to output light, to the AND circuit 98.

If the AND circuit 98 is supplied with an output signal S35 from the comparator 97, and a light-emission instruction signal S36 from the system controller 91, the AND circuit 98 sends a light-emission instruction signal S37 for causing the excitation light source LED 82A to emit light to the LED driver 98.

If the AND circuit 97 supplies the LED driver 99 with a light-emission instruction signal S37, the LED driver 99 applies a constant current to the excitation light source LED 82A so that the excitation light source LED 82A emits light.

Figure 17:
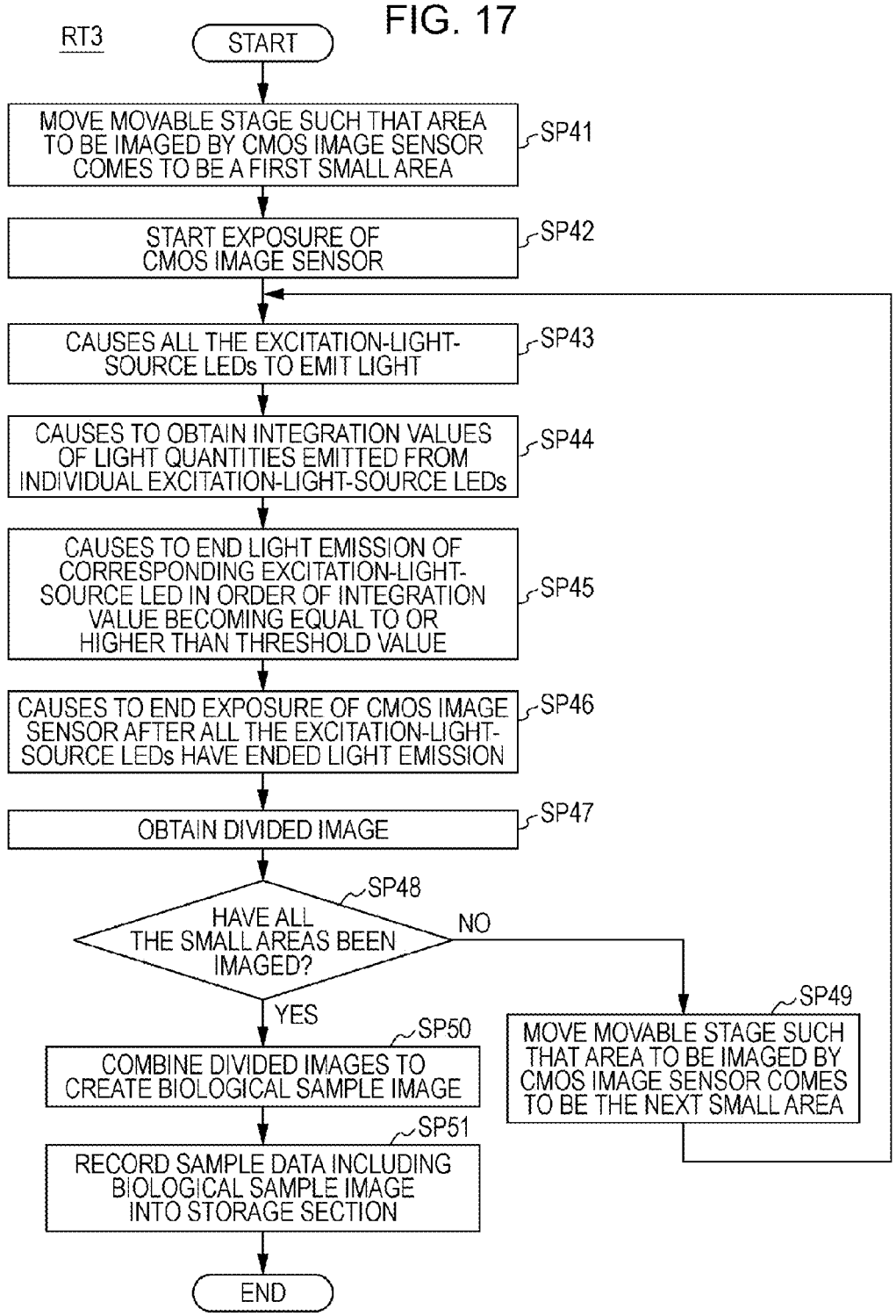
FIG. 17 is a flowchart illustrating a biological-sample-image acquisition processing procedure according to another embodiment.

When the CPU 21 receives an acquisition instruction of an image of a biological sample SPL from the operation input section 24, the CPU 21 loads a program corresponding to the obtained instruction into the RAM 23, and performs processing in accordance with a flowchart shown in FIG. 17.

Actually, the CPU 21 enters a routine RT3 from a start step, and proceeds to the next step SP41. In step SP41, the CPU 21 allocates a sample area PR to a plurality of small areas AR, and moves the movable stage 11 such that an area to be imaged by the CMOS image sensor 14 is a first area AR to be imaged, and the processing proceeds to the next step SP42.

In step SP42, the CPU 21 starts exposure of the CMOS image sensor 14, and the processing proceeds to the next step SP43.

In step SP43, the CPU 21 outputs an electronic flash instruction SS to the light-source control section 90 to cause the excitation light source LEDs 81A and 82A to emit light, and the processing proceeds to the next step SP44.

In step SP44, the CPU 21 causes the light-source control section 90 to obtain integration values of the intensities of light emitted from the excitation light source LEDs 81A and 82A, respectively, and the processing proceeds to the next step SP45.

In step SP45, at the point in time when the integration values become threshold values or higher, the CPU 21 causes the light-source control section 90 to end light emission in sequence from the excitation light source LEDs 81A and 82A, and the processing proceeds to the next step SP46.

In step SP46, after all the excitation light source LEDs 81A and 82A end light emission, the CPU 21 ends the exposure on the CMOS image sensor 14, and processing proceeds to the next step SP47.

In step SP47, the CPU 21 reads out an electronic signal of each pixel of the CMOS image sensor 14 in sequence for each line, obtains a divided image as a result, and the processing proceeds to the next step SP48.

In step SP48, the CPU 21 determines whether all the small areas AR have been imaged. If a negative result is obtained, it means that there is a small area AR yet to be imaged, and thus the processing proceeds to the next step SP49.

In step SP49, the CPU 21 moves the movable stage 11 such that an area to be imaged by the CMOS image sensor 14 becomes the next small area AR, and the processing returns to step SP42.

The CPU 21 repeats from step SP42 to step SP49 until an affirmative result is obtained in step SP48. When the affirmative is obtained, it means that divided images corresponding to all the small areas AR have been obtained, and the processing proceeds to step SP50.

In step SP50, the CPU 21 combines the divided images into a biological sample image, then in the next step SP51, stores the sample data including the biological sample image into the storage section 27, and the processing proceeds to the next step to end the processing.

Figure 18:
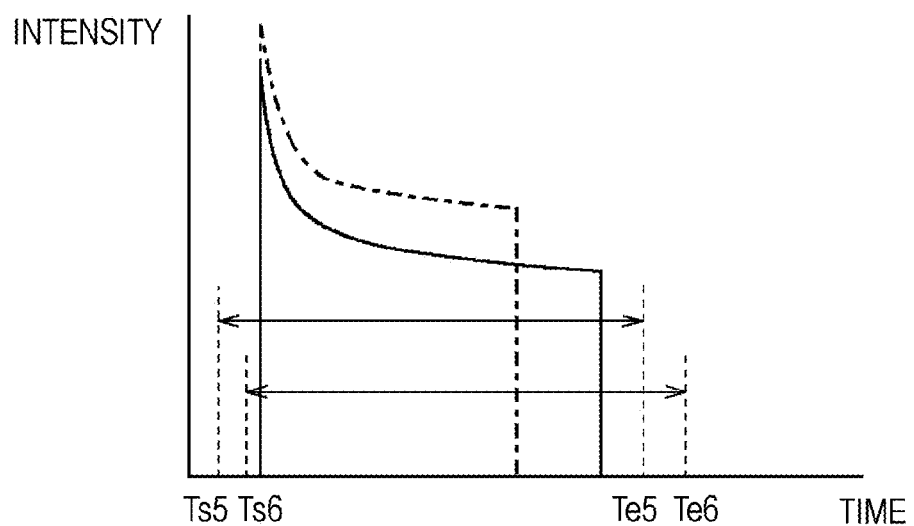
FIG. 18 is a graph illustrating a relationship (1) between light intensity and exposure time according to another embodiment.

In this manner, as shown in FIG. 18, in the biological-sample-image acquisition apparatus 100, before the excitation light source LEDs 81A and 82A emit light, exposure of the CMOS image sensor 14 is started. And in the biological-sample-image acquisition apparatus 100, after both of the excitation light source LEDs 81A and 82A end light emission, exposure of the CMOS image sensor 14 is ended.

In this regard, in FIG. 18, time Ts5 indicates exposure start time of a line on which exposure is started first, and time Ts6 indicates exposure start time of a line on which exposure is started last. Also, time Te5 indicates exposure end time of the line corresponding to time Ts5, and time Te6 indicates exposure end time of the scanning line corresponding to time Ts6.

Also, in FIG. 18, a solid line and a dash-single-dot line indicate light intensities emitted from different excitation light source LEDs 81A and 82A, respectively.

Thereby, in the biological-sample-image acquisition apparatus 100, in the case where a plurality of excitation light source LEDs are disposed, it is possible for the excitation light source LEDs to emit light having a constant amount of light with individual wavelengths.

Also, in the biological-sample-image acquisition apparatus 100, it is possible to keep the exposure quantity of the CMOS image sensor 14 constant without waiting for the excitation light source LED to go into a thermal equilibrium state. Thus, it is possible to shorten an imaging period, and to reduce luminance differences in the biological sample image.

Also, in the biological sample image acquisition apparatus 100, the biological sample SPL is not kept on being exposed to the excitation light as in the case of waiting until the excitation light source LED goes into a thermal equilibrium state, and thus it is possible to restrain color fading of the fluorescent dye stained on the biological sample SPL.

Also, in the above-described second embodiment, a description has been given of the case where the light emission time from the light-source unit 13, in the bright-field mode, onto all the small areas AR is made constant. However, the present application is not limited to this, and the emission time of excitation light, in the dark-field mode, onto all the small areas AR may be made constant.

Further, in the above-described first and second embodiments, a description has been given of the case of using an LED as a light source. However, the present application is not limited, and a mercury lamp or a halogen lamp may be used as a light source.

Further, in the above-described first and second embodiments, a description has been given of the case where a CMOS image sensor 14 is used as an imaging device. The present application is not limited to this, and a CCD may be used as an imaging device.

Figure 19:
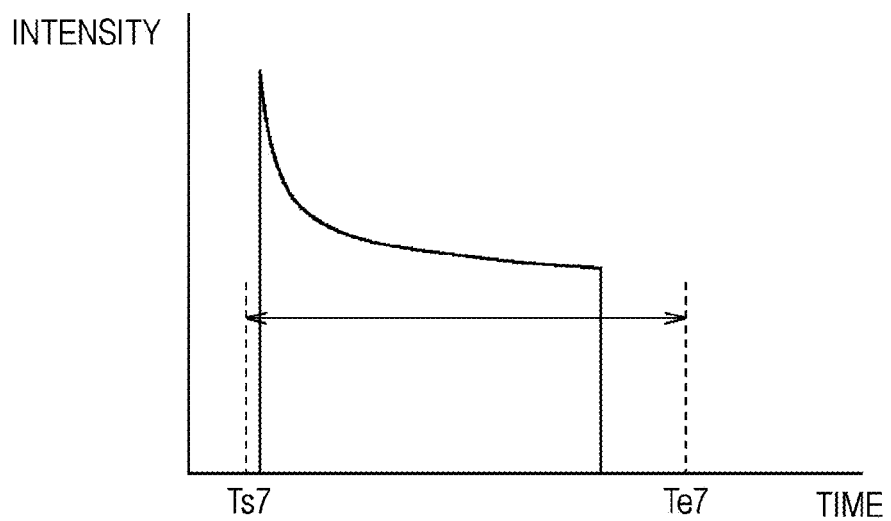
FIG. 19 is a graph illustrating a relationship (2) between light intensity and exposure time according to another embodiment.

If a CCD is employed in place of the CMOS image sensor 14 in the first embodiment, as shown in FIG. 19, exposure of the CCD is started before the white LED 13A emits light, and exposure of the CCD ends after the white LED 13A has ended light emission. Thereby, even in the case of employing a CCD, it is possible to shorten an imaging period, and to reduce luminance differences among the divided images. In this regard, in FIG. 19, time Ts7 indicates exposure start time, and time Te7 indicates exposure end time.

Further, in the above-described first embodiment, a description has been given of the case where exposure of the CMOS image sensor 14 ends after the white LED 13A has ended light emission. The present application is not limited to this. If an emission time period, for which the amount of light emitted from the white LED 13A becomes constant, is given, an exposure time which is further longer than the emission time is set, and the CMOS image sensor 14 may be exposed for the exposure time.

Specifically, if the emission time period, for which the amount of light emitted from the white LED 13A becomes constant, is given as a value, for example, between 30 [ms] and 50 [ms], the exposure time for which all the lines of the CMOS image sensor 14 are exposed is set to 70 [ms], for example.

In this case, in the biological sample image acquisition apparatus 1, it becomes easier to control the CMOS image sensor 14 compared with the case of changing the exposure time of the CMOS image sensor 14. Accordingly, in the biological sample image acquisition apparatus 1, it becomes possible to control the movable stage 11, the white LED 13A, and the CMOS image sensor 14 at a determined timing, and thus it becomes possible to perform total control.

Further, a description has been given that in the above-described first embodiment, the system controller 31, the integrator 32, the comparator 33, the AND circuit 34, and the LED driver 35 of the light-source control section 30 are implemented by hardware. The present application is not limited to this. The integrator 32, the comparator 33, the AND circuit 34, and the LED driver 35 may be implemented by software in the system controller 31 or the CPU 21.

Also, a description has been given that in the above-described second embodiment, the system controller 31, the integrator 32, and the LED driver 35 of the light-source control section 60 are implemented by hardware. The present application is not limited to this. The integrator 32 and the LED driver 35 may be implemented by software in the system controller 31 or the CPU 21.

Also, a description has been given that in the above-described light-source control section 90, the system controller 91, the integrator 92, the comparator 93, the AND circuit 94, the LED driver 95, the integrator 96, the comparator 97, the AND circuit 98, and the LED driver 99 are implemented by hardware. The present application is not limited to this. The integrator 92, the comparator 93, the AND circuit 94, the LED driver 95, the integrator 96, the comparator 97, the AND circuit 98, and the LED driver 99 may be implemented by software in the system controller 31 or the CPU 21.

Further, a description has been given that in the above-described first and second embodiments, the objective lens 12A and the imaging lens 12B are disposed. The present application is not limited to this. Only the objective lens 12A may be disposed. Also, a revolving nose-piece, etc., may be employed to the objective lens 12A in order to allow the magnification to be changed.

Further, in the above-described first and second embodiments, the sample data obtained by the biological-sample-image acquisition processing is stored in the storage section 27. The storage section 27 is not limited to the case of being disposed in the data processing section 20, and may be disposed outside of the data processing section 20. Also, the data communication medium for the storage section 27 is not limited to the bus 28, and for example, a wired or wireless communication medium, such as a local area network, the Internet, digital satellite broadcasting, etc., may be used.

Further, a description has been given that in the above-described first embodiment, the CMOS image sensor 14 is disposed as an imaging device, the photodetector 13C is disposed as a detection section, the integrator 32 is disposed as an integration section, the light-source control section 30 is disposed as a light-source control section, the exposure control section 42 is disposed as an exposure control section, and the image acquisition section 44 is disposed as an image acquisition section. However, in the present application, an imaging device, a detection section, an integrator, a light-source control section, an exposure control section, and an image acquisition section, which have different configurations, may be disposed.

Further, a description has been given that in the above-described second embodiment, the CMOS image sensor 14 is disposed as an imaging device, the photodetector 13C is disposed as a detection section, the integrator 32 is disposed as an integration section, the light-source control section 30 is disposed as a light-source control section, the exposure control section 42 is disposed as an exposure control section, the image acquisition section 44 is disposed as an image acquisition section, the image correction section 47 is disposed as a correction section, and the image generation section 45 is disposed as an image generation section. However, in the present application, an imaging device, a detection section, an integrator, a light-source control section, an exposure control section, an image acquisition section, a correction section, a generation section, which have different configurations, may be disposed.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An image acquisition apparatus comprising:
an imaging device on which images of a plurality of small areas allocated to an area to be imaged are formed;
a processor; and
a memory device storing instructions, which when executed by the processor, cause the processor to:
(a) detect intensity of light irradiated on the small area from a light source;
(b) integrate the detected intensity of light;
(c) if an integration value of the integrated intensity of light from a point in time when light is emitted from the light source is greater than a predetermined threshold value, terminate emission of light from the light source;
(d) start exposure of the imaging device before light is emitted from the light source;
(e) terminate exposure of the imaging device after emission of light from the light source is terminated; and
(f) repeat steps (a) to (e) for the small areas to acquire the images of the small areas as a divided image from the imaging device, wherein each of the small areas are illuminated by the same amount of light.

2. The image acquisition apparatus of claim 1, wherein the imaging device is configured to:
(a) start exposure in sequence for each of lines along an array of pixels; and
(b) terminate exposure in sequence for each of the lines in starting order of exposure.

3. The image acquisition apparatus of claim 1, wherein the instructions, when executed by the processor, cause the processor to, when the exposure of the imaging device is terminated, move the small area of which image is formed on the imaging device to another small area.

4. The image acquisition apparatus of claim 1, wherein the instructions, when executed by the processor, cause the processor to:
(a) detect intensities of light emitted from a plurality of light sources;
(b) integrate the detected intensities of light;
(c) control the plurality of light sources to emit light at the same time;
(d) terminate emission of light in sequence from a light source having an integration value of the intensity of light integrated by the integration section from a point in time when light is emitted from the light source is greater than a predetermined threshold value;
(e) start exposure of the imaging device before light is emitted from the plurality of light sources; and (f) terminate exposure of the imaging device after emission of light from all the plurality of light sources is terminated.

5. The image acquisition apparatus of claim 1, wherein the light source is configured to emit light during exposure of the imaging device before reaching thermal equilibrium.

6. A method of acquiring an image, the method comprising:
   (a) detecting intensity of light irradiated from a light source on a small area allocated to an area to be imaged;
   (b) integrating the detected intensity of light;
   (c) if an integration value of the integrated intensity of light from a point in time when light is emitted from the light source is greater than a predetermined threshold value, controlling the light source so as to terminate emission of light from the light source;
   (d) starting exposure of the imaging device on which an image of the small area is formed before light is emitted from the light source; and
   (e) terminating exposure of the imaging device after emission of light from the light source is terminated; and
   (f) repeating steps (a) to (e) for the small areas to acquire the images of the small areas as a divided image from the imaging device wherein each of the small areas are illuminated by the same amount of light.

7. An image acquisition apparatus comprising:
   an imaging device on which images of a plurality of small areas allocated to an area to be imaged are formed;
   a processor; and
   a memory device storing instructions, which when executed by the processor, cause the processor to:
   (a) detect intensity of light irradiated on the small area from a light source;
   (b) integrate the detected intensity of light;
   (c) control the light source to emit light from the light source such that a time interval between start and end of emission becomes constant;
   (d) start exposure of the imaging device before light is emitted from the light source;
   (e) terminate exposure of the imaging device after emission of light from the light source is terminated;
   (f) repeat steps (a) to (e) for the small areas to acquire the images of the small areas as a divided image from the imaging device, wherein each of the small areas are illuminated by the same amount of light;
   (g) correct a luminance value of the divided image such that an integration value of integrated intensity of light at the time when the divided image is captured becomes the same; and
   (h) generate one image by combining the corrected divided images.

8. The acquisition apparatus of claim 7, wherein the imaging device is configured to:
   (a) start exposure in sequence for each of lines along an array of pixels; and
   (b) terminate exposure in sequence for each of the lines in starting order of exposure.

9. The image acquisition apparatus of claim 7, wherein the instructions, when executed by the processor, cause the processor to, when the exposure of the imaging device is terminated, move the small area of which image is formed on the imaging device to another small area.

10. A method of acquiring an image, the method comprising:
    (a) detecting intensity of light irradiated from a light source on a small area allocated to an area to be imaged;
    (b) integrating the detected intensity of light;
    (c) controlling the light source to emit light such that a time interval between start and end of emission becomes constant;
    (d) starting exposure of the imaging device before light is emitted from the light source;
    (e) terminating exposure of the imaging device after emission of light from the light source is terminated;
    repeating steps (a) to (e) for the small areas to acquire the images of the small areas as a divided image from the imaging device, wherein each of the small areas are illuminated by the same amount of light;
    (g) correcting a luminance value of the divided image such that an integration value of integrated intensity of light at the time when the divided image is captured becomes the same; and
    (h) generating one image by combining the corrected divided images.

* * * * *